United States Patent [19]

Sullivan

[11] Patent Number: 5,307,198
[45] Date of Patent: Apr. 26, 1994

[54] SCANNER WITH COMBINED PREDICTIVE AND DIFFRACTIVE FEEDBACK CONTROL OF BEAM POSITION

[75] Inventor: Paul F. Sullivan, Westwood, Mass.
[73] Assignee: Polaroid Corp., Cambridge, Mass.
[21] Appl. No.: 67,529
[22] Filed: May 25, 1993
[51] Int. Cl.⁵ ............................................. G02B 26/08
[52] U.S. Cl. ..................... 359/196; 359/202; 359/204; 250/237 G; 358/474; 358/486; 358/494
[58] Field of Search ............... 359/196, 201, 202, 204, 359/213, 214, 215, 221; 250/237 R, 237 G, 238, 239, 578.1; 358/486, 488, 494, 496, 498, 474

[56] References Cited

U.S. PATENT DOCUMENTS

| | | | |
|---|---|---|---|
| 4,070,117 | 1/1978 | Johannsmeier et al. | 250/237 R |
| 4,178,064 | 12/1979 | Mrdjen | 359/215 |
| 4,806,753 | 2/1989 | Noguchi | 250/237 R |
| 4,866,512 | 9/1989 | Hirosawa et al. | 358/494 |
| 4,900,924 | 2/1990 | Masuda et al. | 250/237 G |
| 4,912,322 | 3/1990 | Ichikawa | 250/237 G |
| 4,980,781 | 12/1990 | Yamamoto et al. | 358/486 |
| 5,012,089 | 4/1991 | Kurusu et al. | 358/496 |
| 5,105,296 | 4/1992 | Cho et al. | 359/196 |
| 5,200,849 | 4/1993 | Inagaki et al. | 359/196 |

Primary Examiner—Loha Ben
Attorney, Agent, or Firm—Edward S. Roman; Robert A. Sabourin

[57] ABSTRACT

A scanning system includes a scanner mirror driven in a substantially linear pivoting movement by a galvanometer excited with a substantially sawtooth current waveform, the mirror directing a pilot beam in a scanning movement along a photographic film located upon a diffraction grid which forms a part of a holder of the film. The film is transparent to the pilot beam, and is encircled by a frame defining a window for viewing the film. The grid is composed of a repeating sequence of groups of rulings oriented in different directions resulting in correspondingly different directions of the diffracted beam, upon illumination of the grid by the pilot beam. An array of detectors detects the direction of the diffracted beam, which is employed as a feedback signal to accurately locate the pilot beam, to provide fine position data of the pilot beam. One or more data beams for either writing or reading image data upon the film are also scanned by the mirror concurrently with the scanning of the pilot beam for accurate positioning of each write (or read) beam. Blind scanning, with location based on galvanometer current, is employed near an edge of a scan line wherein the diffraction grid may not be illuminated by the pilot beam. Circuitry responsive to transitions between diffracted beams during a scanning of the pilot beam across the grid withholds timing pulses during instances of possible jitter for improved printing and reading of the film.

31 Claims, 15 Drawing Sheets

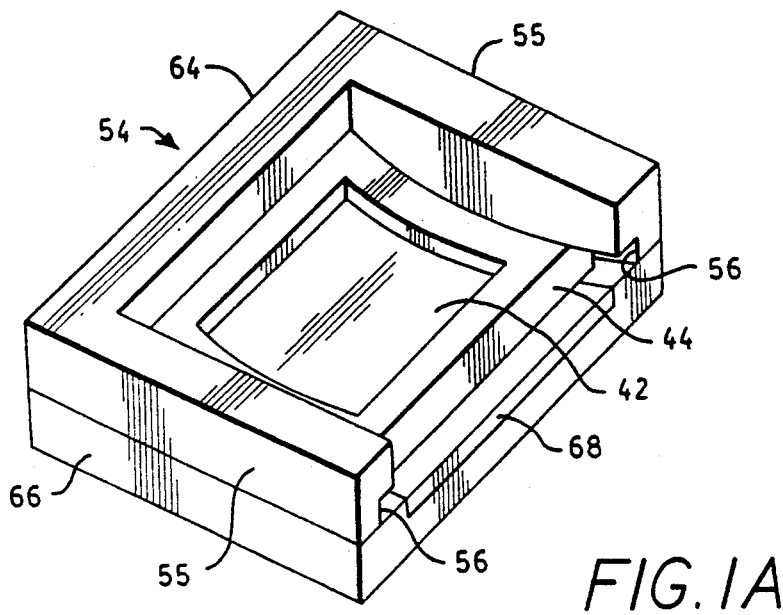
FIG. IA
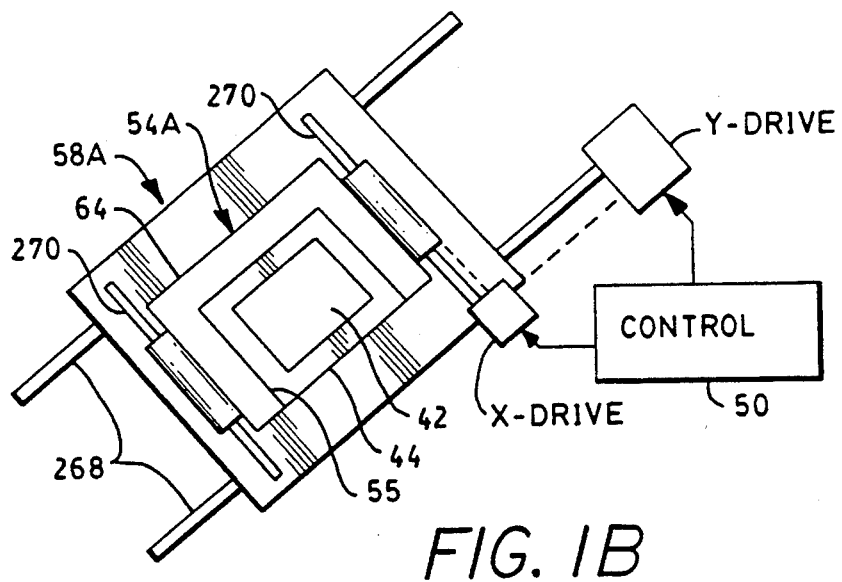
FIG. IB

SCANNER WITH COMBINED PREDICTIVE AND DIFFRACTIVE FEEDBACK CONTROL OF BEAM POSITION

BACKGROUND OF THE INVENTION

This invention relates to the scanner for optically scanning a subject such as an electro-optic scanner of a photographic film for imprinting image data on the film and, more particularly, to the use of an optical diffraction grating disposed on a holder of the film for increased accuracy in positioning an optical beam upon the film.

One form of electro-optic scanner employs a scanning mirror which directs a beam of light to a subject, such as a photographic film, and scans the beam across the film by a pivoting motion of the mirror. Accurate scanning of the subject requires knowledge of the beam location on the subject during all parts of the beam scan.

The typical scanner may be employed for reading an image of the subject, such as a photographic image, and for storing data in a digital memory at locations corresponding to the beam positions. Alternatively, the scanner may be employed in a writing mode for writing pixels of image data from locations within a memory to corresponding locations on a photographic film. In both cases, knowledge of beam location may be obtained from the mirror pivot angle or from an electric current which drives a motor, such as a galvanometer, to pivot the mirror.

A problem arises in that there may be an error in determination of beam location based on a knowledge of the motor current due to the dynamic behavior of the mirror. For example, the beam may be one or more pixels ahead or behind of a presumed beam location, particularly in a scanning system employing very high resolution. As a result, errors and/or image degradation may occur during either a reading or a writing of image data.

SUMMARY OF THE INVENTION

The aforementioned problem is overcome, and other advantages are provided by a scanning system which, in accordance with the invention, includes an optical detector assembly and a film holder operative with a scanner which directs a pilot beam of light towards a photographic film carried by the film holder. One or more write beams are also directed by the scanner to the photographic film for writing image data upon the film. The principles of the invention may be employed also, if desired, to the implementation of a read beam to be directed by the scanner to the film for reading image data from the film. The write beam(s) and the read beam may be referred to collectively as data beams. In most cases, one of the data beams can serve as the pilot beam as well, with tighter specifications for the optics train or reduced system performance. Typically, the scanner is provided with an oscillating mirror pivoted by an electric motor in the form of a galvanometer wherein the galvanometer is driven by an electric current having a generally sawtooth waveform. As a feature of the invention, the current waveform departs slightly, near end portions of a sweep and during retrace, from a linear sawtooth format to an essentially sinusoidal format to reduce mirror vibrations which might occur due to rapid change of direction of movement at each turning point of the sawtooth waveform.

The invention provides for a positioning of a diffraction grid upon the holder, and located behind the photographic film as viewed by the scanning pilot beam. The electromagnetic frequency of the pilot beam is chosen in accordance with the material of the photographic film such that the film is permeable to and not activated by the pilot beam, so as to allow the pilot beam to impinge upon the grid to develop a diffracted beam. This is most easily effected in the case of the film transparencies typically referred to as 35 mm slides, but can be extended to reflection prints. The grid is formed of a periodic array of groups of rulings, wherein the rulings of successive ones of the groups are directed in different directions in accordance with a repeating pattern of groups of rulings. The diffracted beam is composed of various orders of diffracted beams which collectively resemble a fan beam, and is directed in any one of a plurality of directions, depending on the specific orientation of a group of rulings illuminated by the pilot beam. As the pilot beam scans along the film and the grid, the diffracted beam is directed periodically in different directions, the direction of the diffracted beam indicating the location of the diffracted beam along the scan path, modulo the length of the repeating sequence of the ruling pattern. The optical detector assembly includes a set of light detectors positioned about a central axis of the assembly for sensing the direction of the diffracted beam. The grid may be fabricated as a reflecting grid, in which case the detector assembly is disposed along an optical path in front of the grid.

By way of example in the use of the scanning system for writing data upon the film, the data may be stored digitally as an array of pixels of an image in a digital memory at specified locations within the memory to be addressed during the writing process. During the scanning of each of many scan lines upon the film, the memory is addressed in synchronism with the position of the pilot beam to activate a write beam to imprint the stored pixel data from the memory upon the corresponding location of the film. By way of example, a write beam may be provided with a lower electromagnetic frequency than the pilot beam, and with substantially higher intensity than the pilot beam, so as to interact with a dye in the film to produce a specific color. Other write beams may be provided to activate other dyes for production of other colors, each write beam having its specific frequency for interaction with a desired dye. For example, there may be a red, a green and a blue write beam serving as primary colors for dyes operative in the additive color process, or cyan, magenta and yellow write beams serving as primary colors for dyes operative in the subtractive color process. The write beams may be arranged, one behind the other and preceded by the pilot beam or, alternatively, may be arranged side by side and preceded by the pilot beam. The addressing of the memory for specific pixel data for each of the write beams is delayed from the known location of the pilot beam in accordance with the positional offsets of the respective write beams from the pilot beam.

The invention provides for increased accuracy in the determination of the location of the pilot beam by using data of diffracted beam direction obtained from the detector assembly. The instantaneous amplitude of the sawtooth motor current provides coarse information as to the location of the pilot beam, which coarse information may be employed near an end of a scan line wherein the diffraction grid is hidden from view of the pilot beam. The direction of the diffracted beam provides precise information as to the location of the pilot beam within the length of the repeating sequence of the ruling pattern. The ambiguity of the repeating pattern is removed by simply counting sections of the pattern from a known reference point, such as an edge of the diffraction grid. The invention includes transfer circuitry for alternating control of scanning between the diffraction grid and the sawtooth current waveform, the diffraction grid providing for a linear precision scan during all of the forward portion of a scan line except for ends of a scan line wherein the grid is not viewed by the pilot beam.

The photographic film is normally permanently fastened to an encircling frame which is to be positioned in a film holder. A carriage is provided as the film holder, and serves to transport the film from a distant site to the scanning apparatus. For example, a cassette of film slides may be provided at the distant site with means for automatically loading film slides from the cassette to the carriage. To facilitate alignment of the frame within the holder or carriage, a load stop is provided against which the frame is abutted. Any misalignment between the frame and the stop results in a corresponding inclination of the image on the film relative to the frame. In particular, such inclination results in a blind scanning of the film wherein an inclined edge of a window in the frame hides the pilot beam from the diffraction grid. The occlusion of the grid during a portion of a scan line by a part of the frame is accommodated by the invention, by use of a blind scanning mode wherein an instantaneous amplitude of the sawtooth waveform is provided from a stored replica of the waveform, with suitable transfer procedure of the invention being employed between the grid-aided scanning and the blind scanning modes of operation. When the grid edge comes into view of the pilot beam near the beginning of a line scan, operation of the scanner immediately reverts to use of the diffraction grid to provide fine location data. A second transfer procedure of the invention minimizes discontinuities at this location.

As a further feature of the invention for increasing the accuracy of the sensing of the phases of regions of the grid by the detection of successive ones of the diffracted beams, a comparison is made between the intensity of a diffracted beam from one grid region and the intensity of the diffracted beam from the next region. As the pilot beam passes over an interface between the two regions, the sense of the comparison changes between high and low logic states. Signal processing circuitry notes the direction of change in the sense of the comparison to determine whether the pilot beam is traversing the grid in a forward direction or in a reverse direction. An up-down counter in the signal processing circuitry counts down for grid phase increments in the forward scanning direction, and counts up for grid phase increments in the reverse scanning direction. In the event of a disturbance causing an unwanted reverse scanning movement, such as an unintentional jarring of the scanner, the signal processor withholds further clocking signals to the scanning system until the up-down counter has been restored to its proper count. This protects the scanner from jitter.

BRIEF DESCRIPTION OF THE DRAWING

The aforementioned aspects and other features of the invention are explained in the following description, taken in connection with the accompanying drawing wherein:

FIG. 1A is a fragmentary perspective view of holder of a film sheet in the scanner of FIG. 1, the holder providing for a curvature of the film sheet in a preferred embodiment of the invention;

FIG. 1B is a fragmentary perspective view, partially diagrammatic, of a carriage for supporting the holder of FIG. 1B in accordance with an alternative embodiment of the invention wherein the carriage provides for a two-dimensional scanning movement of the film sheet;

DETAILED DESCRIPTION

Figure 1:
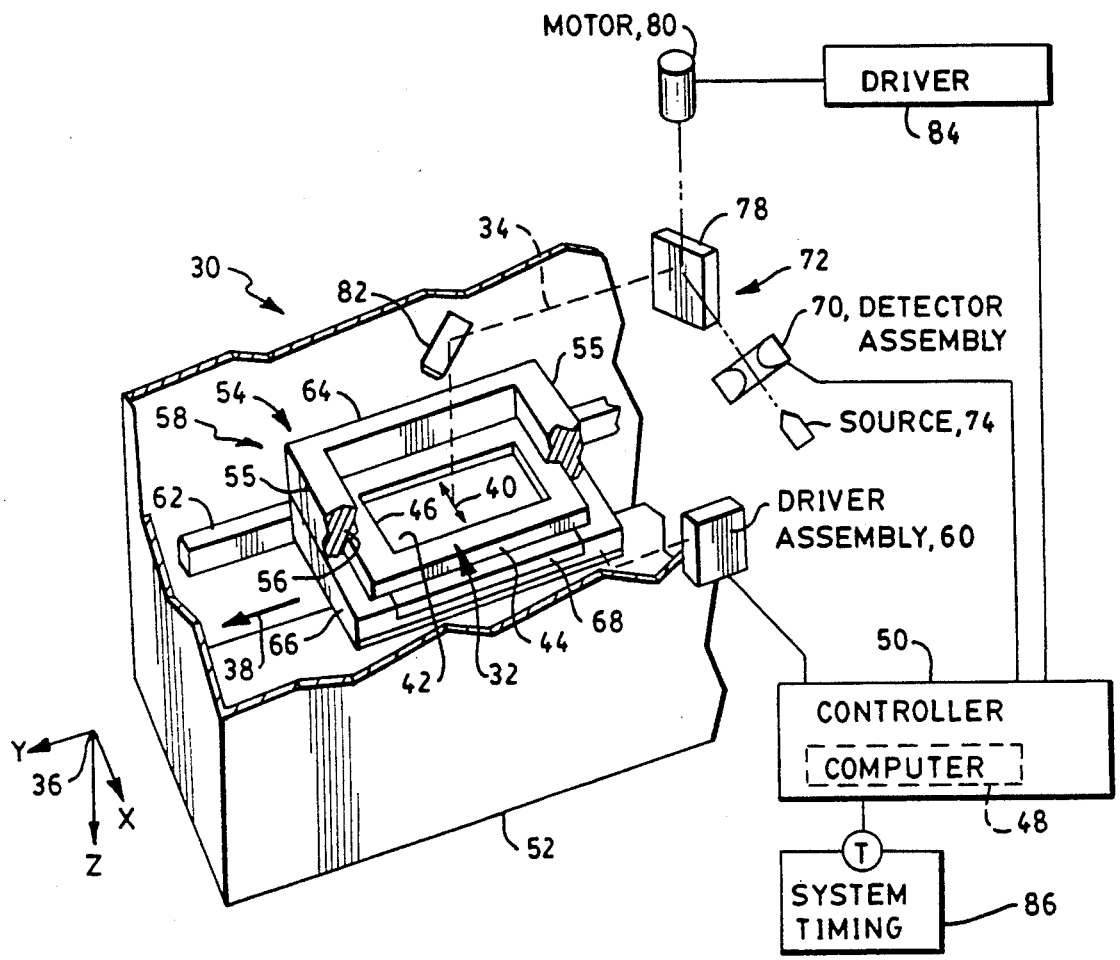
FIG. 1 is a stylized view of a scanner with portions of a housing of the scanner being cut away to show interior details, the figure including components of a control system of the scanner indicated diagrammatically.

In FIG. 1, a scanner 30 provides for a scanning of a subject 32, in accordance with the invention, by use of a pilot beam 34 which is scanned across the subject 32. A coordinate axes system 36 is shown in FIG. 1 adjacent the subject 32 to facilitate explanation of movement of the subject 32 in a longitudinal direction, indicated by an arrow 38 parallel to the Y axis, with scanning of the beam 34 being accomplished in a transverse direction, indicated by an arrow 40 parallel to the X axis. By way of example, in the practice of the invention, the subject 32 comprises a sheet of film 42 supported by a frame 44 which has a rectangular shape and encircles the film 42. Typically, the film 42 is a color transparency often called a film slide, though, if desired, a transparent gray-scale film or reflection print may be employed. In the case of the color transparency, the electromagnetic frequency of the pilot beam 34 is sufficiently high or low, as compared to a frequency band of interaction of radiation with pigments of the film, so as to enable the film 42 to be substantially transparent to the light of the pilot beam 34. Beams of radiation within the band of interaction with the film pigments, as will be described hereinafter, are to be employed for interacting with pigments or dyes within the film 42 for imprinting markings, such as pictorial data, upon the film 42 in the three primary colors. The three primary colors are either cyan, magenta and yellow for pigments operative with the subtractive color process, or red (R), green (G) and blue (B) for pigments operative with the additive color process, the latter being employed by way of example in the ensuing description. In this fashion, a blank sheet of the film 42, previously unexposed to light, can be imprinted or written with pictorial information by the scanner 30.

The pilot beam 34, in accordance with an important feature of the invention, is employed, in a manner to be described hereinafter, for increasing the accuracy in which pixels of the pictorial data can be located upon the film 42. The inner perimeter of the frame 44 defines a window 46, which, during a scanning of the subject 32 by the pilot beam 34, delineates the boundary of the film 42 for a computer 48 within a controller 50 of the scanner 30. The components of the scanner 30 are enclosed by a housing 52, partially shown in the figure, which defines an enclosed region, or print station, for printing or writing data on the film 42. Portions of the housing 52 have been cut away to show a positioning of the subject 32 within a holder 54 having end walls 55 with slots 56 for receiving top and bottom edges of the frame 44. In a preferred embodiment of the invention, the slots 56 are curved to impart a concave cylindrical shape to the subject 32 as shown in FIG. 1A.

In operation, the holder 54 is part of a carriage 58 which serves to transport the subject 32 for a scanning of the subject 32, as in a printing process for printing image data upon the film. A driver assembly 60 is disposed upon the housing 52 and, in response to signals of the computer 48, translates the carriage 58 along a supporting rail 62 for insertion and withdrawal of the subject relative to a region in the housing 52 wherein the printing is accomplished. Alignment of the subject 32 is facilitated by the holder end walls 55 and a load stop 64 both of which extend upward from a floor 66 of the carriage 58. The load stop 64 is formed as a back wall of the holder 54 and extends between the holder end walls 55. The slots 56 are open along a side of the holder 54 opposite the stop 64 to permit emplacement of the subject 32 within the holder 54 and removal of the subject 32 from the holder 54. During a loading of the subject 32 upon the carriage 58, the subject 32 slides along the slots 56 until contacting the stop 64, whereupon a longitudinal edge of the frame 44 abuts the stop 64 so as to maintain parallelism between the longitudinal edge of the frame 44 and the Y axis.

In accordance with a feature of the invention, a portion of the floor 66 of the carriage 58 is fabricated as an optical diffraction grid 68 which interacts with the pilot beam 34 to provide a diffracted beam directed in any one of a plurality of directions wherein the direction of diffraction is indicative of the instantaneous position of the pilot beam 34 during a transverse motion of the beam 34 along the film 42. A detector assembly 70 monitors the direction of the diffracted beam, and transmits to the controller 50 a signal upon each change in direction of the diffracted beam. During a uniform translation of the scanning beam 34 in the X direction along the grid 68, the signal outputted by the detector assembly 70 has a form suitable for use as a clock signal to be counted by a counter, as will be described hereinafter, for measurement of distance traversed from a reference point. By use, in the subject 32, of film which is transparent to the pilot beam 34, a scanning of the subject is accompanied by a concurrent scanning of the diffraction grid 68 for provision of highly accurate position data of the pilot beam 34. The scanning of the pilot beam is accomplished by an optical system 72 comprising a light source 74, a scanning mirror 78 which is pivoted about its axis by a motor 80 preferably in the form of a galvanometer, and a folding mirror 82. In the embodiment of FIG. 1, light from the source 74 propagates via the mirrors 78 and 82 to impinge as the pilot beam through the film 42 upon the grid 68, the pivoting of the mirror 78 serving to scan the pilot beam 34. Light diffracted from the grid 68 passes back through the film 42, and is reflected by the mirrors 82 and 78 to the detector assembly 70. The motor 80 is energized by a driver 84 under command of the controller 50. The scanning of the mirror 78 and the translation of the carriage 58 may be synchronized by use of a system timing unit 86 which outputs timing signals via terminal T to the controller 50 and the computer 48.

Figure 2:
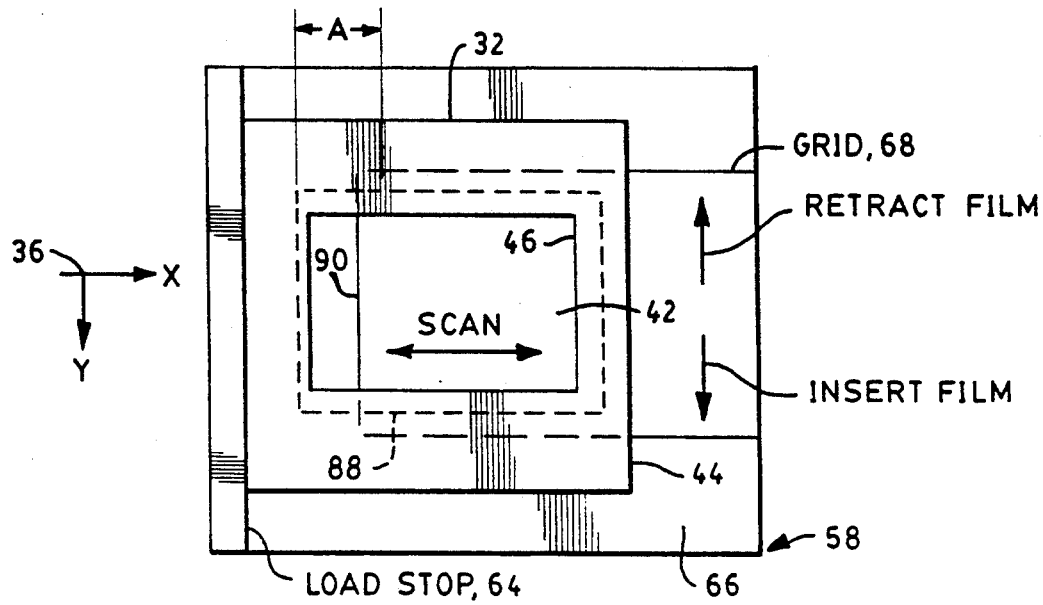
FIGS. 2 and 3 are partial plan views of a film holder of FIG. 1 wherein a frame supporting the film is positioned against a load stop of the holder in FIG. 2, and is angled relative to the load stop in FIG. 3.
Figure 3:
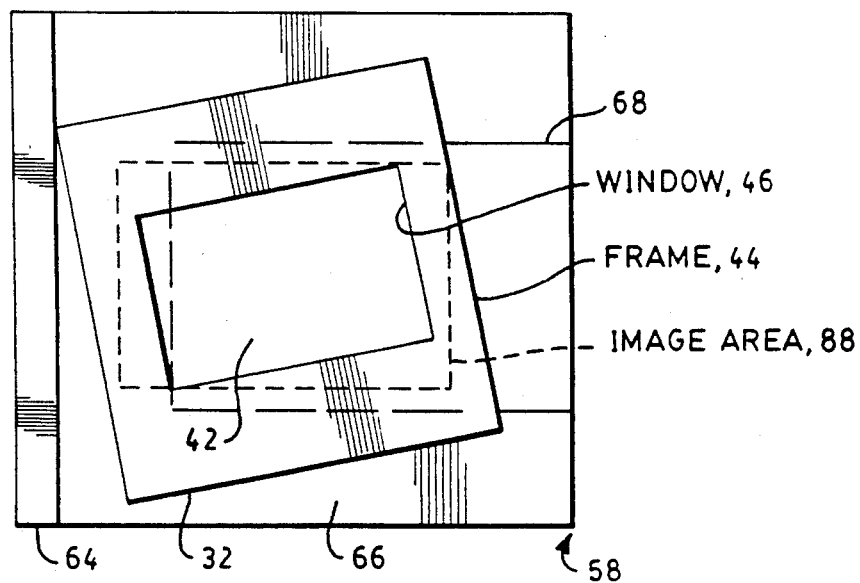

FIGS. 2 and 3 show greater detail in the positioning of the subject 32 in the carriage 58 of FIG. 1. In FIG. 2, the frame 44 of the subject 32 is parallel to the stop 64 and abuts the stop 64 so as to provide alignment of the subject 32 with the X and the Y axes of the coordinate axes system 36. An image area 88, indicated by a dashed line, identifies the region upon the floor 66 of the carriage 58 wherein an image is to be generated. The image area 88 is slightly larger than the window 46 so as to permit the printing of image data within all portions of the film 42 bounded by the window 46, even in the event of slight misalignment of the subject 32 relative to the stop 64 as shown in FIG. 3. The diffraction grid 68 extends beyond the top and the bottom of the image area 88 as viewed in FIG. 2, and extends beyond the right side of the image area 88 to ensure that the grid 68 is available for inputting precise position data to the scanning process for all of the scan lines within the image area. On the left side of the grid 68, the grid edge 90 is spaced apart to the right of the left edge of the image area 88 so as to be visible within the window 46, even in the case of the misalignment portrayed in FIG. 3. The left side of the image area 88 is positioned at, or slightly to the left of, the left edge of the window 46 in FIG. 2 so as to allow the image area 88 to enclose all portions of the window 46, both in the aligned case of FIG. 2 and the misaligned case of FIG. 3.

A feature of the invention is the use of the diffraction grid 68, in a manner to be described, as a scale for measuring the number of pixels scanned during a line scan in the X direction. The viewing of the grid edge 90 by the pilot beam 34 (FIG. 1) provides for use of the grid edge 90 as a reference mark for designating a beginning of the scale. During the balance of a scan line until the frame 44 is reached, the pilot beam 34 illuminates the grid 68 and, therefore, is on scale for providing the desired pixel location data throughout substantially the balance of the line scan. The scanning in the X direction may be referred to as a fast scan while a slower movement of the carriage 58 in the Y direction may be referred to as a slow scan. During the scanning in the X direction or alternating with it, the carriage 58 is moved in the Y direction at the relatively slow speed. The slow scan provides for displacement in the Y direction between successive ones of the fast scans of the X direction.

In the operation of the scanner 30 (FIG. 1), the carriage 58 advances relatively fast into the housing 52 during an insertion phase of the operation, and then retracts relatively slowly in a retraction phase of the operation. During the insertion phase, the scanner 30 produces the fast scan providing data to the computer 48 with respect to the location of the grid edge 90. Subsequently, during the retraction phase, the carriage 58 advances in the slow-scan direction, during which time the scanner 30 provides the fast scan for printing image data upon the film 42.

It is to be noted that the misalignment portrayed in FIG. 3 is exaggerated to facilitate a showing of the misalignment. In corresponding fashion, the spacing between the grid edge 90 and the left edge of the image area 88 is exaggerated. Thus, in the practice of the invention, the gap between the left edge of the window 46 and the grid edge 90 is no more than a small fraction of a scan line, possibly a few percent of a scan line. Also, in the practice of the invention, it is contemplated that the subject 32 may be placed manually upon the carriage 58, or automatically upon the carriage 58. Typically, in the use of the invention, the subject 32 is one of a plurality of film slides mounted within a cassette (not shown) remote from the housing 52, and wherein automatic loading equipment (not shown) transfers the film slides one by one to the carriage 58 for transferal to the print station within the housing 52. Upon completion of each printing procedure, the film slide is withdrawn from the housing 52 and returned to the cassette area whereupon the printed film slide is replaced with a blank film slide. Also shown in FIG. 2 is a region A extending from the left side of the image area 88 to the pilot beam position at the beginning of on-scale printing of the image. The width of the region A, as measured along the X direction, is equal to the offset in position of the pilot beam relative to the first of the print beams to avoid the necessity of introducing an address offset in a memory from which write data is extracted during the process of imprinting data on the film. The use of the scale data for precise positioning of printed pixels is initiated at a location slightly to the right of the grid edge 90, at which point, in the operation of a fast scan, the controller 50 (FIG. 1) has recognized the grid edge 90 and initiated use of the on-scale data.

Figure 4:
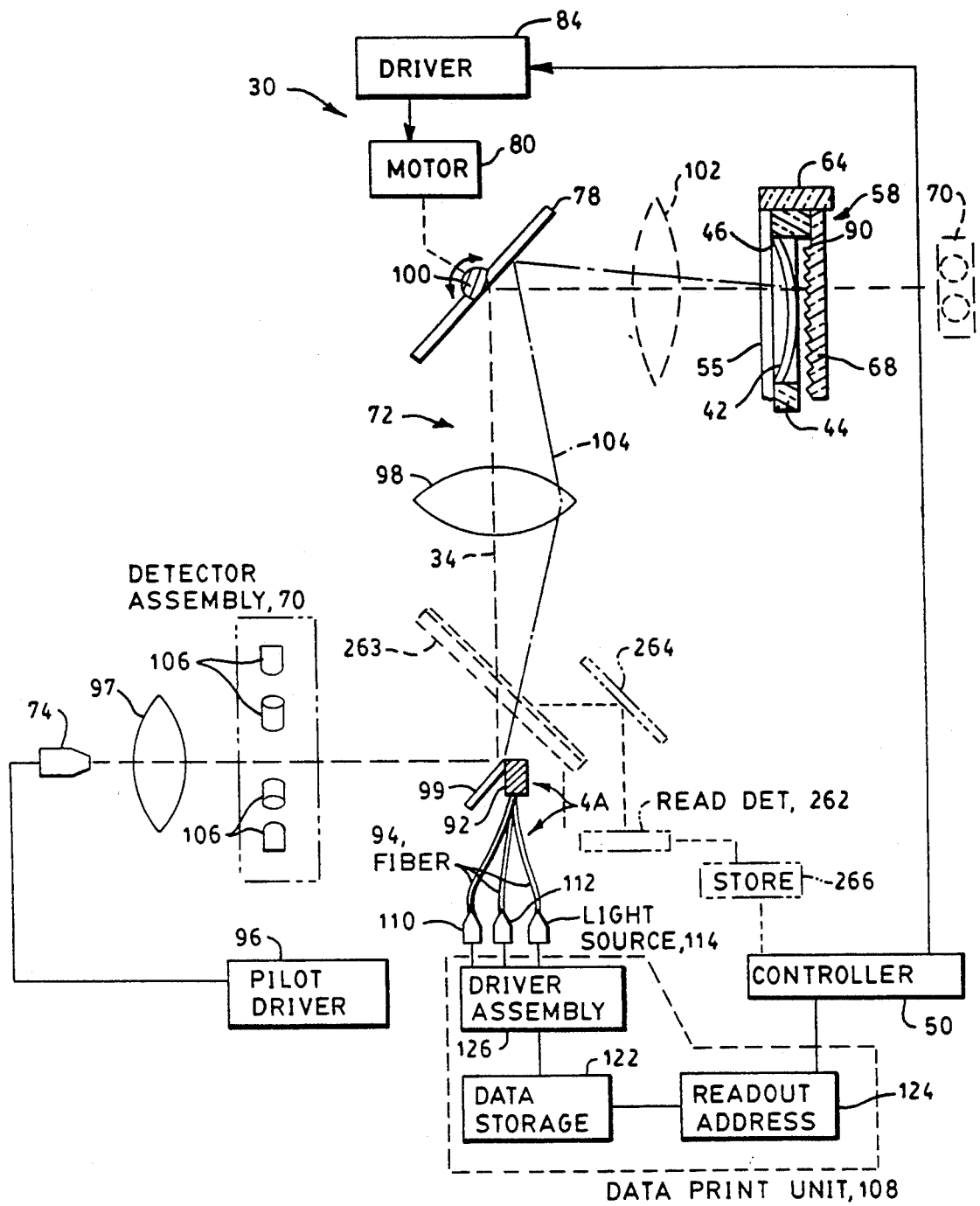
FIG. 4 shows diagrammatically in plan view an optical system and associated control equipment for the scanner of FIG. 1.
Figure 4B:
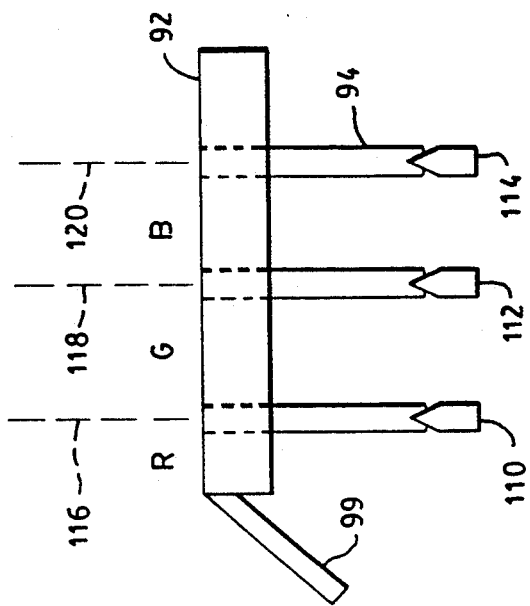
FIG. 4B shows, in an alternative embodiment of the invention, a fragmentary view of the optical system of FIG. 4 with an array of light sources shown in plan view, and in the same viewing direction as FIG. 4, wherein the array of writing light sources of FIG. 4B is rotated ninety degrees about an optical axis relative to array of light sources of FIG. 4A.
Figure 4A:
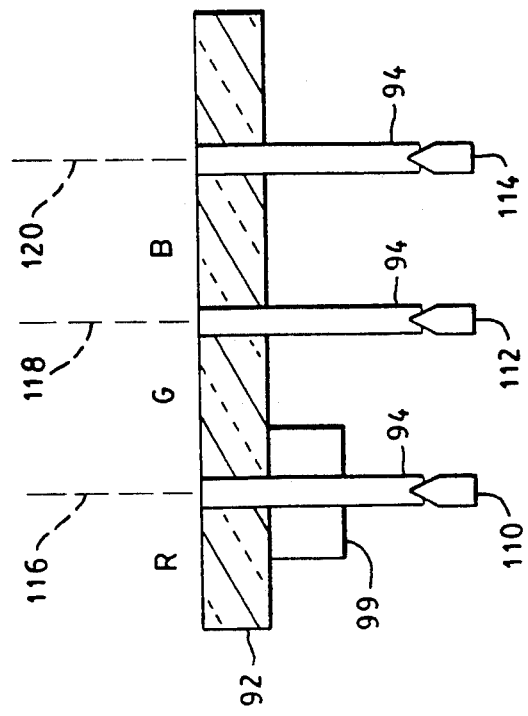
FIG. 4A is a fragmentary elevational view of the optical system shown in FIG. 4, showing schematically a side view of an array of light sources with optical fibers connecting with a face plate.

FIGS. 4, 4A and 4B provide further information in the construction and the use of the optical system 72 (FIG. 1), the view of FIG. 4 being shown without the optical folding by the folding mirror 82 (FIG. 1) to simplify the presentation. A face plate 92 having three optical fibers 94 connected thereto is employed, in a manner to be described, for generation of a set of three write beams. The plate 92 may be fabricated of glass or polycarbonate or silicon, by way of example, and serves as a support for the light emitting ends of the optical fibers 94. The light source 74 for the pilot beam 34 is a laser diode spaced apart from the face plate 92. Electrical circuitry for energizing the source 74 is provided within a pilot driver 96. Light of the pilot beam 34 is emitted from the source 74 in the form of a diverging cone, and lenses 97 and 98 are provided for gathering the diverging rays of light from the source 74 and for focusing these rays upon the grid 68. A mirror 99 (shown also in FIGS. 4A and 4B) is mounted to the side of the plate 92, and serves to fold the optical path of the pilot beam 34. The lens 97 serves to focus light of the source 74 in the vicinity of the mirror 99, the light being refocused by the lens 98 to focus upon the grid 68.

Figure 10:
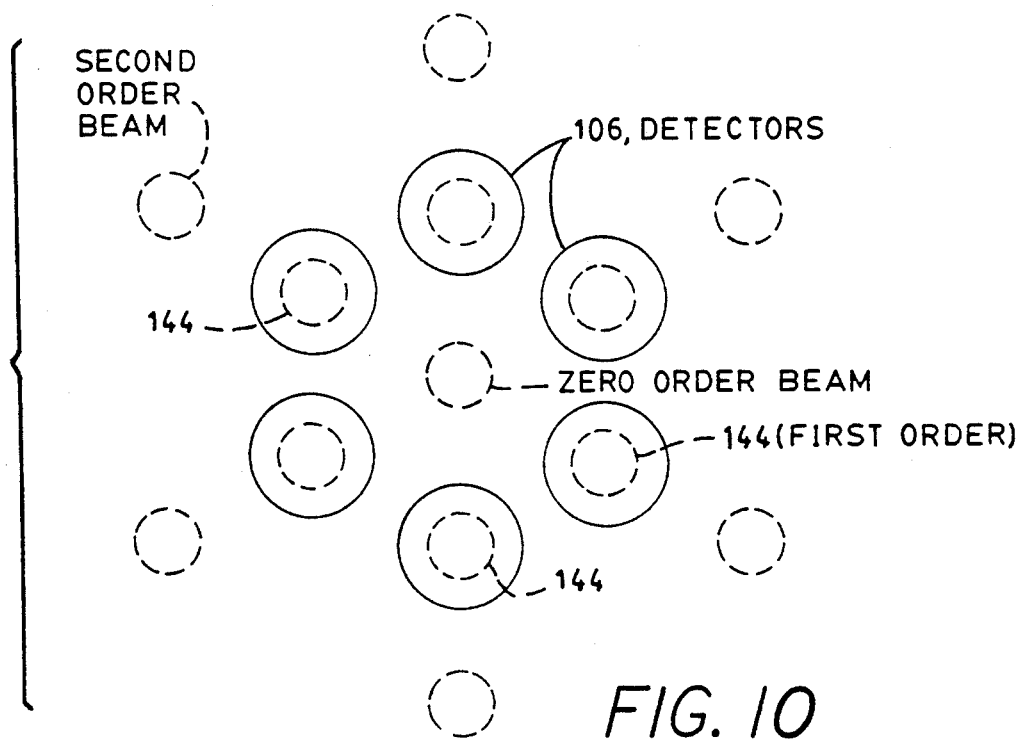
FIG. 10 shows a plan view of an array of detectors of the assembly of FIG. 8.

To simplify the presentation of FIG. 4, only a principal ray of the pilot beam 34 is shown. The scanning mirror 78 is supported by a shaft 100, by which shaft the motor 80 imparts a pivoting movement to the mirror 78. It is recognized that, during the line scan, the primary ray of the pilot beam 34 is reflected at different angles relative to the mirror 78 due to the continuous pivoting of the mirror 78. In the preferred embodiment of the invention, the concave surface of the film 42 in the holder 54 faces the mirror 78, and the radius of curvature of the film surface is centered at the mirror shaft 100. This provides normal incidence of the pilot and the write beams upon the film 42 independently of the instantaneous orientation of the mirror 78 during each scan line. By way of alternative embodiment, the holder slots 56 could be straight (not shown) to hold the film 42 flat, in which case a barrel lens, such as lens 102 (indicated in phantom), may be employed for redirecting the pilot beam 34 to impinge with normal incidence upon the film 42. The carriage 58 is presented in sectional view to show propagation of the pilot beam 34 through the film 42 to impinge upon the diffraction grid 68. The grid 68 is fabricated in a reflecting mode (to be described with reference to FIG. 6), to produce a diffracted beam 104 which propagates back through the film 42, and then propagates along an optical path extending via the mirror 78, the lens 98, and the mirror 99 to impinge upon specific ones of detectors 106 of the detector assembly 70. The detectors of the assembly 70 are positioned between the lens 97 and the mirror 99 and, if desired, may even be positioned about a peripheral portion of the lens 97. Both the transmitted beam of light from the source 74 and the zero-order portion of the diffracted beam pass along a central axis of the detector assembly 70 without impinging upon the detectors 106 which are set back from the central axis of the assembly 70 (FIG. 10).

Also shown in FIG. 4 is a data print unit 108 operative under control of the controller 50 for energizing a set of print light sources 110, 112, and 114 for providing beams 116, 118, and 120 of light (FIG. 4A) for writing image data upon the film 42. Each of the light sources 110, 112, and 114 may comprise a laser diode, and is coupled via an optical fiber 94 to the plate 92. Each of the sources 110, 112, and 114 may include a filter (not shown) for providing a desired frequency band to the light of each of the write beams 116, 118, and 120 such that, by way of example, the beam 116 interacts with a red pigment of the film 42 to write a red pixel, and similarly, the beams 118 and 120 interact with green and blue pigments to produce green and blue pixels, respectively, upon the film 42.

The plate 92 holds the light emitting ends of the fibers 94 of the sources 110, 112, and 114 in a predetermined array. The location of the pilot beam 34 from the light source 74 upon the film 42 is offset from the location of the array of write beams 116, 118, and 120 upon the film 42 by the location of the mirror 99. Each of the beams 116, 118, and 120 is focused by the lens 98 and directed by the scanning mirror 78 to impinge upon a desired pixel of the film 42 during each scan line in the same fashion as has been described above for the pilot beam 34. The data print unit 108 comprises data storage 122 for storing color data of an image to be imprinted upon the film 42, an address unit 124 for addressing the storage 122 for reading out data to be imprinted, and a driver assembly 126 having circuits for energizing individual ones of the light sources 110, 112, and 114 in accordance with data outputted from the storage 122. The controller 50 directs the address unit 124 to provide for a reading out of the stored data in synchronism with the positions of the write beams 116, 118, and 120 upon the film 42.

Figure 5:
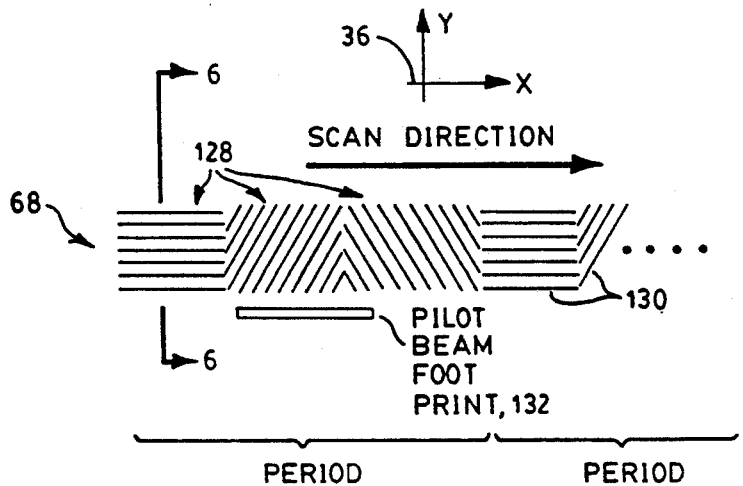
FIG. 5 is an enlarged fragmentary view of a diffraction grid showing orientation of rulings in a succession of groups of rulings of the diffraction grid, indicated in FIG. 1.
Figure 6:
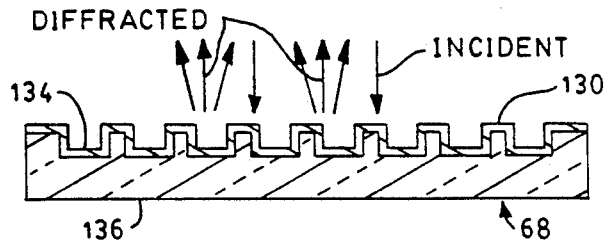
FIG. 6 is a sectional view of the diffraction grid showing rulings of a single group of rulings, the sectional view being taken along the line 6—6 of FIG. 5 in a direction perpendicular to the longitudinal direction of a ruling, the grid of FIG. 6 including a reflective surface for operating in a reflective mode.
Figure 7:
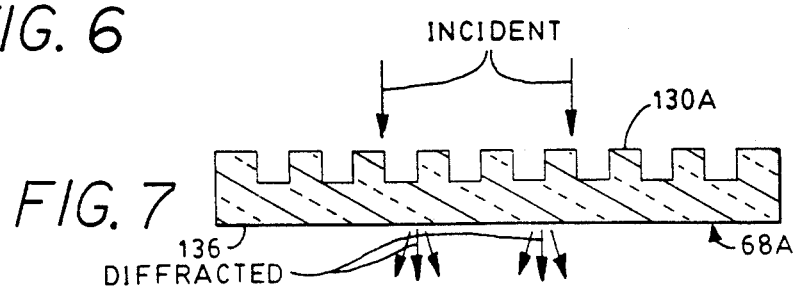
FIG. 7 is a sectional view of a diffraction grid, similar to that of FIG. 6, but in accordance with an alternative embodiment of the invention wherein the grid is transparent to incident radiation for operation in a transmission mode.

With reference to FIGS. 5, 6, and 7, the diffraction grid 68 comprises regions 128 of grid rulings wherein, in each region 128, there is a set of parallel rulings 130, as shown in FIG. 5. For example, in the first region 128 to the left of FIG. 5, the rulings 130 are directed parallel to the X axis. In the next group 128, the rulings 130 are directed at 60 degrees relative to the X axis. In the third group 128, the rulings 130 are directed at an inclination of 120 degrees relative to the X axis. In the fourth region 128, the direction of the rulings 130 is rotated another 60 degrees to bring the rulings 130 in a direction parallel to the X axis. Thus, the direction of the rulings 130 of the respective regions 128 are altered in a cyclical manner providing for a periodic array of regions 128 with three of the regions 128 in each period.

The footprint of the pilot beam 34 is shown alongside the portions of the grid 68 presented in FIG. 5, the footprint 132 extending somewhat beyond the width of one of the regions 128, by way of example, so as to overlap on at least two of the regions 128. However, if desired, a longer footprint, or a shorter footprint not necessarily overlapping two of the regions 128, may be employed in the practice of the invention. For example, the footprint 132 may extend only one-quarter to one-third of the width of a region 128 as measured in the X direction (the fast scan direction). The rulings 130 are fabricated in a first embodiment of the grid 68 by use of reflective metallization 134 overlaying grooves embossed into a surface of a substrate 136 of a suitable material such as cellulose acetate butyrate, by way of example as shown in FIG. 6. Diffracted beams resulting from the incident pilot beam 34 are directed by the reflective metallization 134 back toward the detector assembly 70.

Alternatively, as shown in an alternative embodiment of grid 68A in FIG. 7, the reflective metallization 134 is deleted to produce rulings 130A which allow for propagation of optical energy through the substrate 136 with the result that most of the diffracted radiation appears on a back side of the grid 68A opposite the incident radiation. Use of the grid 68A, instead of the grid 68, requires some modification of the optical system of FIG. 4, the modification being accomplished as follows. The detector assembly 70 is moved from its location facing the mirror 99 to a position behind the carriage 58, wherein the detector assembly 70 is indicated in phantom, to enable the detector assembly 70 to detect diffracted rays radiated from the back side of the grid. The mirror 78 is held in a fixed orientation, and the carriage 58 is replaced with a carriage 58A (FIG. 1B) enabling a mechanical scanning of the film 42 in two dimensions, the X and the Y directions, while the pilot and the write beams are held stationary. The carriage 58A will be described hereinafter.

Figure 8:
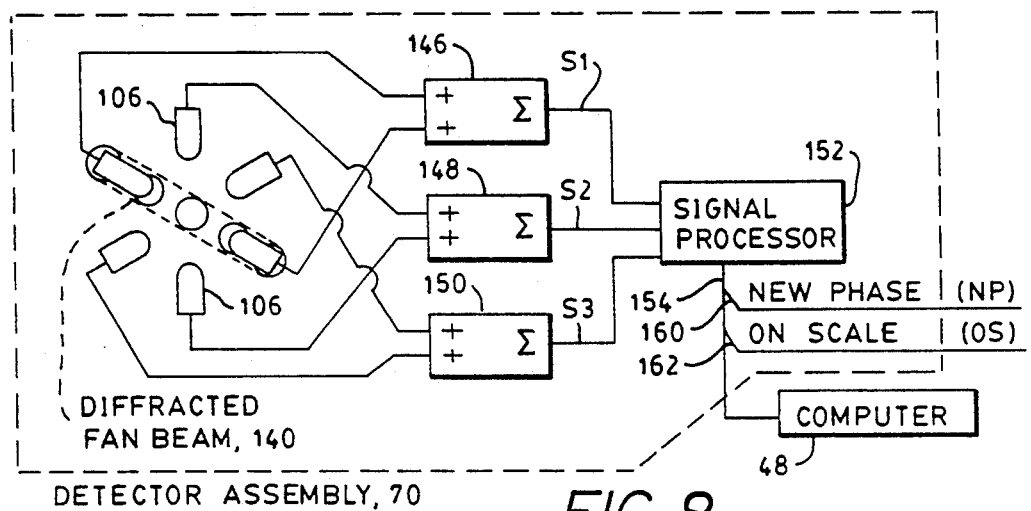
FIG. 8 is a diagrammatic view of an optical detector assembly of FIG. 1.
Figure 9:
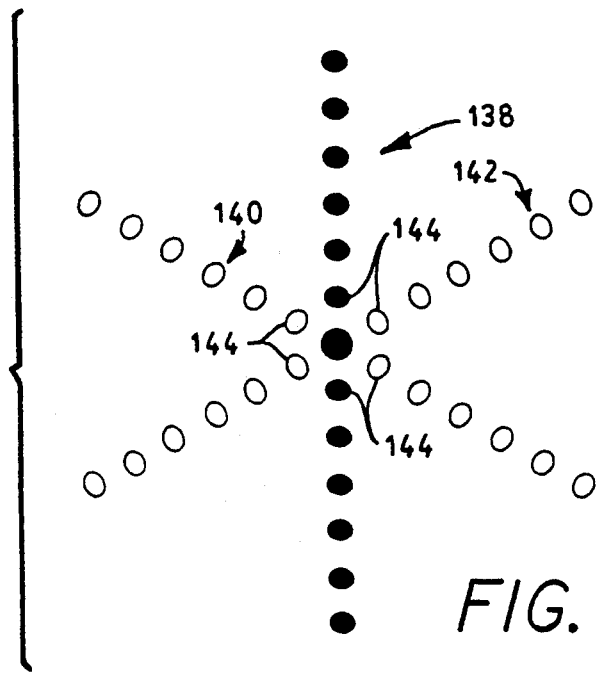
FIG. 9 shows possible diffraction patterns which can be produced by various phases of the diffraction grid, one pattern being shown more intensely to indicate illumination by one of the phases of the grid pattern.

With reference to FIGS. 5, 8, 9, and 10, each region 128 of rulings 130 produces a planar array of diffraction beams of various orders (FIG. 9), wherein the envelope of the diffraction beams in any one plane has the shape of a fan beam, with the plane of the fan beam being perpendicular to the rulings 130 in a region 128. By way of example, in the case wherein the pilot beam 34 illuminates a small portion of the region 128 at the left side of FIG. 5, a set 138 of diffracted beams is produced, the set 138 being oriented in the vertical direction of FIG. 9 and shown highlighted. The next region 128, wherein the rulings are oriented at 60 degrees relative to the X axis, produces a diffraction pattern composed of a set 140 of diffracted beams lying in a plane inclined 60 degrees relative to the set 138, while the third region 128 provides for a set 142 of diffracted beams lying in a plane angled 60 degrees in the opposite sense from the set 138. Upon illumination of rulings 130 of two contiguous regions 128, two sets, such as the sets 138 and 140 of the diffracted beams are produced, with the relative intensities of the two sets 138 and 140 depending on the amount of illumination provided by the pilot beam 34 in each of the two contiguous regions 128. The zero order of diffraction appears at the center of the array of beams of FIG. 9. The beams 144 adjacent the central beam in the array of FIG. 9 are first order diffracted beams, other ones of the beams located radially outward being higher order diffracted beams. By way of example, the fan-beam envelope for the set 140 of FIG. 9 is shown also in FIG. 8.

In order to detect the diffracted beams, the detectors 106 of the detector assembly 70 are located in a circularly symmetric array, in a preferred embodiment of the invention, as shown in FIGS. 8 and 10. However, if desired, the invention can be practiced by use of only a semicircular array of the detectors 106. The detectors 106 are indicated diagrammatically in FIGS. 8 and 10. FIG. 10 presents a plan view of an array of such detectors wherein the radiation-receiving region, or face, of each detector 106 is shown as a solid circle. The diffractive orders of the various diffracted beams are shown as dashed circles in correspondence with the array of diffractive orders of FIG. 9. The faces of the detectors 106 are provided with diameters and locations in the array of detectors overlying only the first order diffractive components of the diffracted beams. Thereby, the zero order and possibly higher orders above the first diffractive order of the diffracted beams preferably do not impinge upon the detectors 106.

As shown in FIG. 8, each of the detectors 106 outputs an electric signal in response to radiation incident upon the detector. The signals outputted by diametrically opposed pairs of the detectors 106 are summed together by summers 146, 148, and 150. The summer 146 outputs a sum signal S1 produced by the set 140 of the diffracted beams, the summer 148 outputs a sum signal S2 produced by detection of the set 138 of diffracted beams, and the summer 150 outputs a sum signal S3 upon detection of the set 142 of diffracted beams. The sum signals produced by the summers 146, 148, and 150 are employed by a signal processor 152 (to be described hereinafter) to produce signals which enable the grid 68 to be employed as a scale for measuring position along a scan line. In FIG. 8, signals are outputted by the signal processor on line 154 for use by the computer 48 and other components of the scanner 30, as will be described hereinafter. Included in the signals of line 154 are the new phase (NP) signal (shown in first graph of FIG. 11 and the second graph of FIG. 16) branching off on line 160 and the on-scale (OS) signal branching off on line 162. The NP signal represents a phase increment experienced in the presence of relative motion between pilot beam 34 and the grid 68, as the center of the beam crosses the interface between contiguous grid regions 128, during scanning in the X direction. The OS signal indicates that the grid 68 is being illuminated by the pilot beam 34 for providing accurate beam position data.

Figure 11:
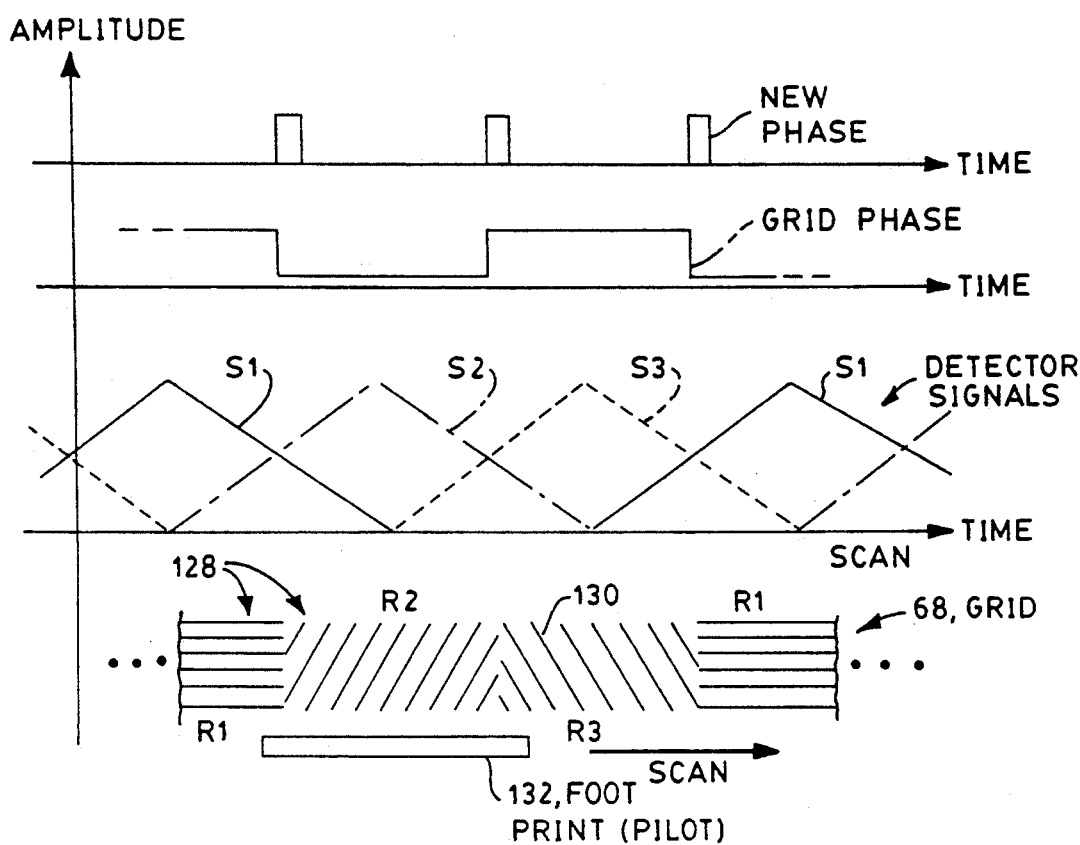
FIG. 11 shows waveforms of signals outputted by the detector assembly of FIG. 8 during a scanning of a pilot light beam in FIG. 1.

As shown in FIG. 11, each of the sum signals S1, S2 and S3 periodically rises and falls in intensity. It is to be understood that the presentation in FIG. 11 is schematic only. For any finite footprint 132 (FIG. 5) of the pilot beam 34, there is overlap among any pair of successive ones of the S1, S2 and S3 signals as the pilot beam passes over an interface of successive phases or regions 128 of the grid 68 such that, by way of example, the S2 signal begins to appear prior to the termination of the S1 signal. Thus there is overlap between the S1 and the S2 signals, between the S2 and the S3 signals, and between the S3 and the S1 signals with progression of the pilot beam 34 along the grid 68. The grid 68 retransmits to the detector assembly 70 substantially all of the optical energy in the diffracted beams independently of the portion of the grid 68 illuminated by the pilot beam 34. Therefore, the total energy received at the detector assembly 70 from the S1 signal, in the case of a relatively short footprint 132 which illuminates only the corresponding R1 region 128, is essentially the same as that received from the sum of the S1 signal and the S2 signal during illumination by the pilot beam 34 of the interface of the corresponding two contiguous regions 128 (R1,R2) of the grid 68. The intensity of the S1 signal drops as the pilot beam moves off of the R1 region 128.

Figure 12:
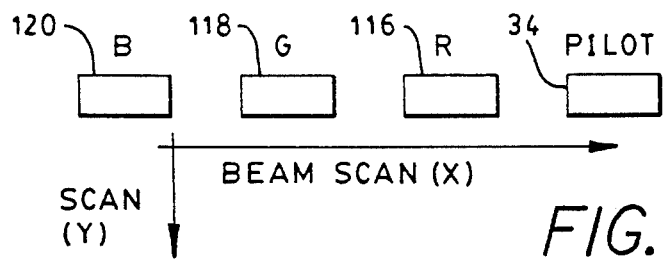
FIG. 12 shows an array of light sources supported by a carrier of FIG. 4, the light sources in FIG. 12 being shown diagrammatically and in plan view.
Figure 13:
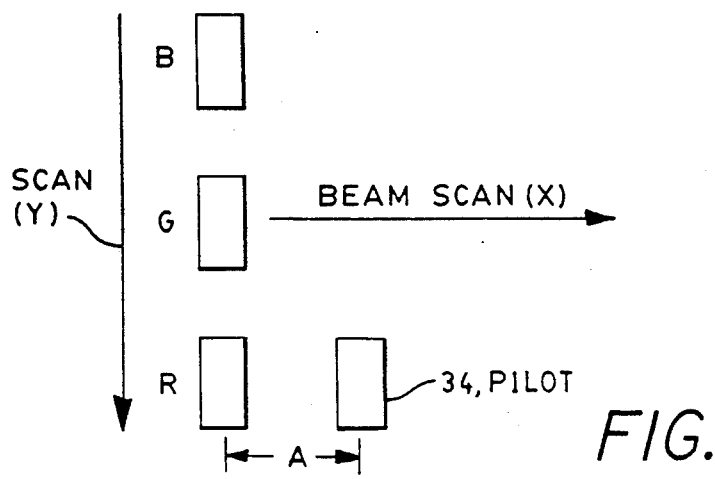
FIG. 13 is a view of the light sources of FIG. 12 in accordance with an alternative embodiment of the invention wherein a pilot light source is disposed transversely to an array of colored light sources, rather than colinearly with the light sources as shown in FIG. 12.

FIGS. 12 and 13 show two possible arrangements of the write beams 116, 118, and 120 along with the pilot beam 34 upon the sheet of film 42. In FIG. 12, the three write beams are arranged colinearly with the pilot beam 34 preceding the write beams by the spacing A (shown also in FIG. 2). The spacing A is provided, as noted hereinabove, with the aid of the mirror 99 (FIGS. 4 and 4B) mounted on the end of the face plate 92. The write beams follow in the order wherein, by way of example, the red beam 116 follows the pilot beam, the green beam 118 follows the red beam 116, and the blue beam 120 follows the green beam 118. The spatial separation of the three write beams in FIG. 12 is accomplished by the corresponding spatial separation of the light emitting ends of the optical fibers 94 at the face plate 92. Greater or lesser spacing of the write beams can be accomplished by a corresponding increase or decrease in the spacing of the optical fibers 94 in the plate 92. The location of the pilot beam 34 plus known increments in positions of the beams 116, 118, and 120 from the location of the pilot beam serve as an address for addressing the data storage 122 (FIG. 4) to output data to the respective write beams.

FIG. 13 shows an arrangement of the write beams and pilot beam which is provided by the configuration of the optical system 72 of FIGS. 4 and 4A, and which is employed in the preferred embodiment of the invention because of simplicity in addressing of the data storage 122. In FIG. 13, the linear array of positions of write beams is oriented perpendicularly to the X scan direction, and the pilot beam 34 is located forward of the array of write beams and offset therefrom by the offset A. The colors of the three write beams R, G, B are arranged with the red beam leading the green and the blue beams in the Y direction (slow scan) of beam movement over the film 42. It is noted that the Y direction of beam movement over the film is attained by movement of the film 42 in the opposite direction by the carriage 58. The pilot beam 34 is offset from the red beam in the direction of the X scan (fast scan). The addressing of the data storage 122, in the case of FIG. 13, includes also the Y component of the address which differs among the respective write beams. However, with the arrangement of FIG. 13, the addressing is simplified in that no differential X address offset is required between the various write beams because they all have the same X component of address.

Figure 14:
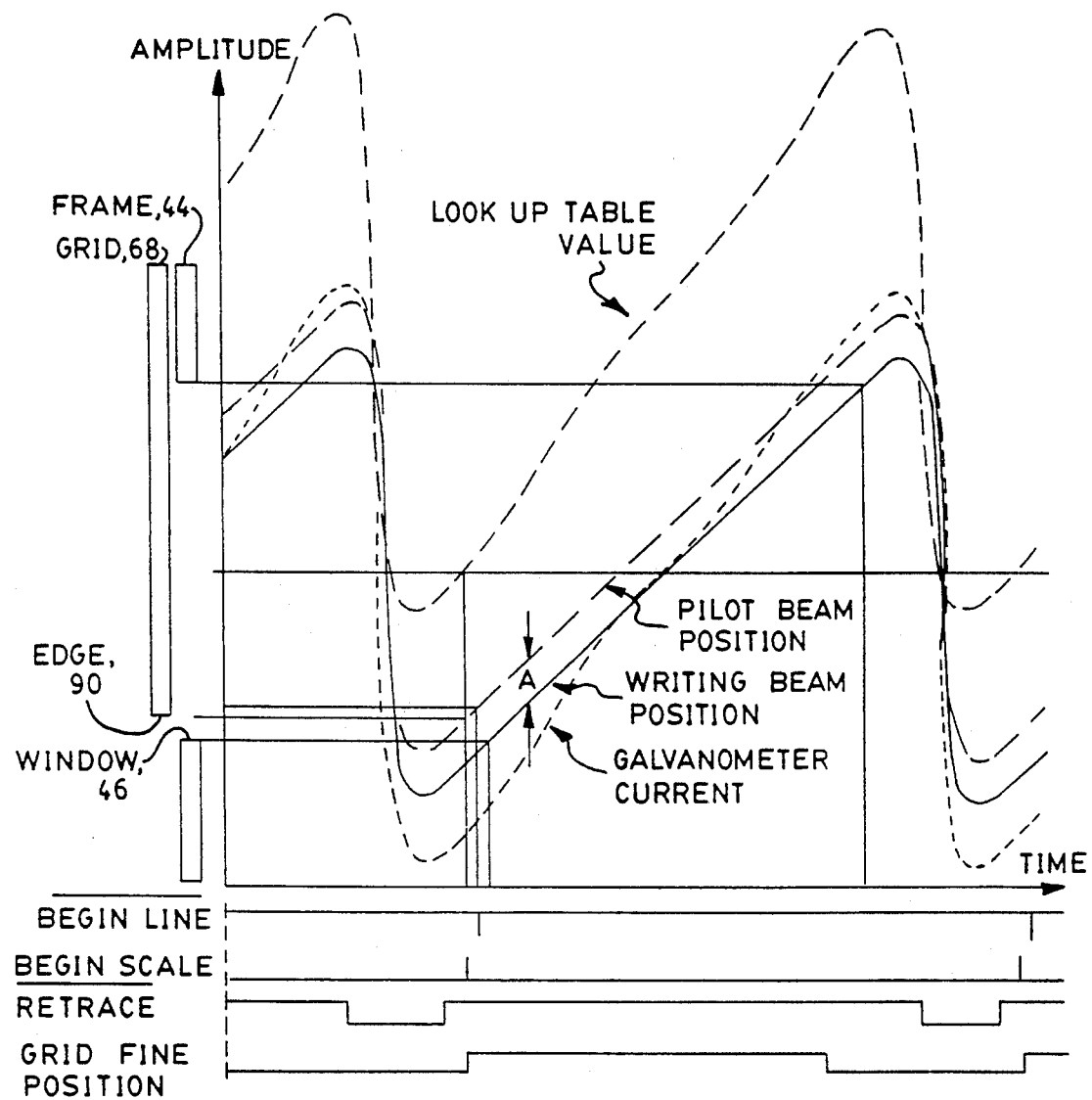
FIG. 14 is a graph of various waveforms useful in explaining operation of a scanning mirror of the scanner of FIG. 1.

The graph of FIG. 14 shows various waveforms employed in scanning the pilot beam 34 (FIG. 1) across the subject 32 and the grid 68. The horizontal axis in FIG. 14 shows time, and the vertical axis shows the amplitude of various waveforms as a function of the time. Four generally sawtooth-shaped waveforms are presented, namely, the waveform of the galvanometer current for pivoting the scanning mirror 78, a set of current drive signals stored in a look-up table, or memory, within the controller 50 for operation of the motor driver 84, the position of the pilot beam 34 produced by operation of the scanning mirror 78, and the position of a write beam, such as the red beam 116 (FIGS. 4 and 4A) provided by the scanning mirror 78. The left side of the window 46 (FIG. 2), provided by the frame 44, is shown also at the lower left side of the graph of FIG. 14, while the right hand side of the window 46 (FIG. 2) is shown at the top left side of the graph of FIG. 14. Also depicted along the left side of the graph of FIG. 14 is the grid 68 with the edge 90 shown at the lower left side of the graph. The dimension "A" of FIG. 2 is indicated also in FIG. 14 where this dimension is the spacing, along the vertical axis, between the pilot beam position and a write beam position. Additional traces at the bottom of FIG. 14 show the interval of time wherein the grid 68 is used for fine position data, the interval of time reserved for retrace of the scanning mirror 78, as well as the time wherein the linear scan begins use of the grid 68, and a reference point for beginning of a new line of data in the storage 122 (FIG. 4).

As will be described in further detail hereinafter, the scanning mirror 78 can be pivoted by feeding a sawtooth current waveform to a galvanometer which pivots the mirror, and the use of the look-up table allows for introduction of deviations from a linear current command to compensate for any nonlinear perturbations within the galvanometer circuit. The commanded current to the galvanometer is generally proportional to the position of the scanning mirror 78, but does not represent highly accurate information as to the location of the scanning pilot beam. Accordingly, in accordance with a feature of the invention, linear scanning is accomplished by use of the grid 68, with control of the scanning motor 80 being transferred to the look-up table values of FIG. 14 during end portions of each line scan and at top and bottom portions of each exposure wherein a diffracted beam is not present. The transfer between grid generated signals and signals from a look-up table for control of the scanning motor 80 will be described in further detail, hereinafter.

Figure 15:
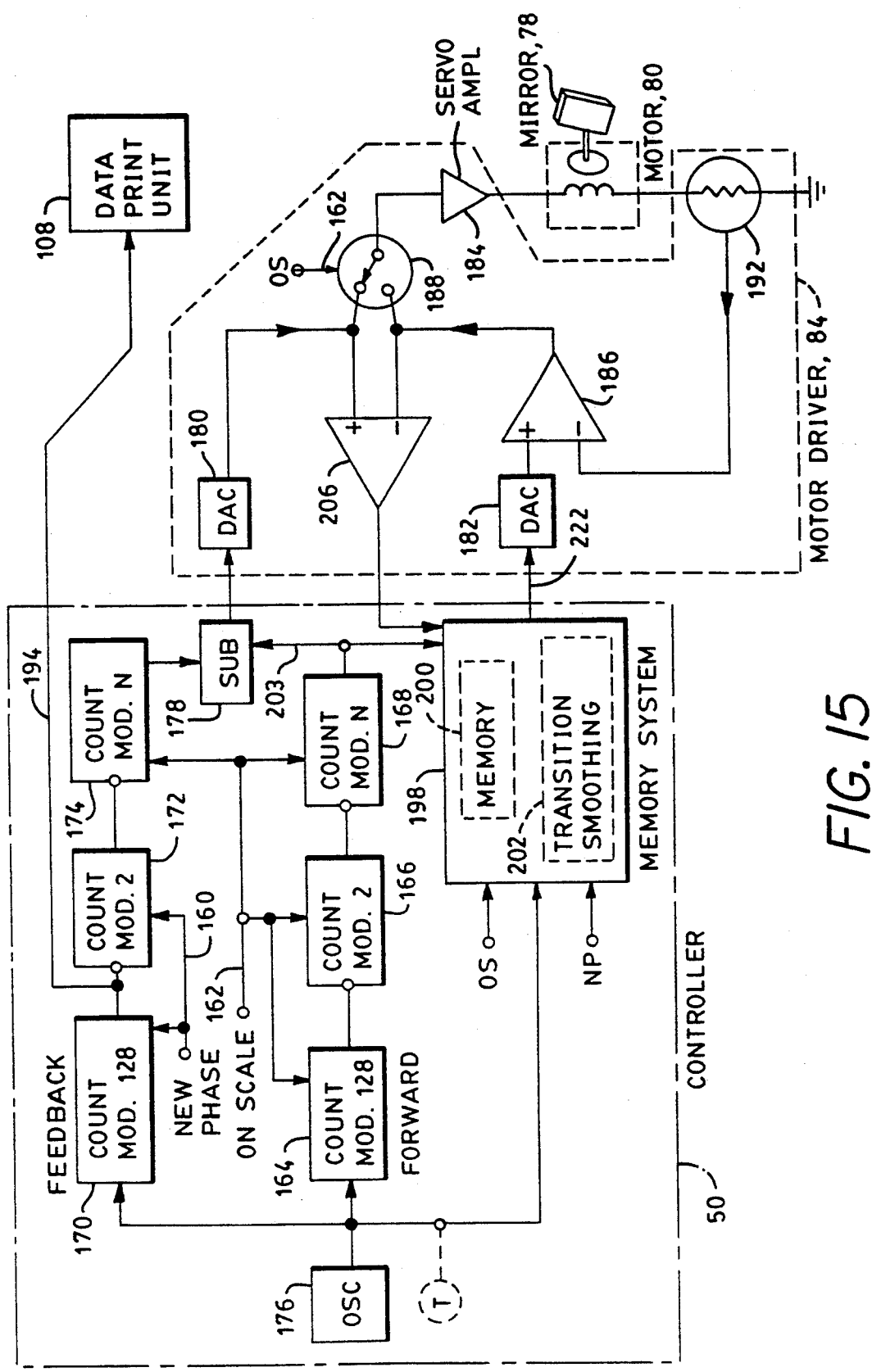
FIG. 15 is a block diagram showing details in the construction of a controller of FIGS. 1 and 4, and connection of the controller via a driver to a scanning mirror.

With reference to FIG. 15, the controller 50 connects with the motor driver 84 and the data print unit 108, as disclosed above with reference to FIG. 4. In FIG. 15, the controller 50 comprises a forward branch and a feedback branch for activation of the driver 84. The forward branch comprises three counters 164, 166, and 168, and the feedback branch comprises three counters 170, 172, and 174. The counters 164 and 170 receive clock pulses from an oscillator 176 of the controller 50 or, alternately, if desired, clock pulses may be provided from terminal T of the system timing unit 86 (FIG. 1). The counters 164 and 170 count, for example, modulo 128 whereupon the counters reset themselves so as to perform the functions of frequency dividers. The counter 164 provides a square-wave signal to the counter 166, and the counter 170 provides a square-wave signal to the counter 172. The square-wave signal is provided by the most significant bit (MSB) of the counters 164 and 170. All counters increase on the falling edge of their respective input clock, resulting in a normal binary count output. In similar fashion, the counters 166 and 172 count modulo 2 to provide a square-wave signal reduced in frequency by another factor 2. Counters 166 and 172 are included to illustrate a way of compensating for a difference between the pitch of the grating and the pitch of pixels in the image. They may count by a different modulus, especially modulo 1, if desired.

The counters 168 and 174 are driven by the output clock signals of the counters 166 and 172, respectively, to provide counts which increase linearly with time, this corresponding to a stepwise representation of a sawtooth waveform. Both of the counters 168 and 174 count modulo N wherein N is a sufficiently large number of counts to provide the desired linear current drive to the motor 80. For example, the number N may be equal approximately to one-half the number of pixels in the scan line. The difference between the commanded count of the forward branch and the actual count of the feedback branch constitutes an error signal, and is obtained by a subtracter 178 which forms the difference between the counts of the counters 168 and 174. The output of the subtracter 178 is applied to the driver 84 for driving the motor 80. The attainment of feedback data relating to the actual position of the pilot beam 34 (FIG. 1) as compared with the commanded position of the pilot beam 34 will be described below.

The driver 84 comprises two digital-to-analog converters 180 and 182, two amplifiers 184 and 186, a switch 188 and a sensor 192 of current flowing in a winding of the motor 80. In the operation of the driver 84, the converter 180 converts the signal outputted by the subtracter 178 from digital to analog format, and applies the resulting analog signal via the switch 188 and the amplifier 184 to the motor 80. The amplifier 184 is a servo amplifier including PID (proportional plus integral plus differential) control for stability in the feedback loop, and converts the analog signal to a drive current for driving the motor 80. The switch 188 is operated by the on-scale (OS) signal provided by the detector assembly 70 on line 162. Thereby, a drive signal from the converter 180 is coupled to the motor 80 only during the portion of a line scan wherein the pilot beam is on scale, and the diffracted beams from the grid 68 are available for providing precise position data as to the location of the pilot beam. During end portions of the line scan wherein the diffracted beams are absent, the on-scale signal places the switch 188 in an alternate position for providing an alternate form of current drive to the motor 80, via the previously stored sawtooth waveform of FIG. 14, as will be described below.

In operation, the feedback branch of the controller 50 obtains data with respect to the actual location of the pilot beam 34 (FIG. 1) by use of the diffracted beams from the grid 68. As disclosed above with reference to FIGS. 5, 8, and 11, the grid phase waveform changes state with each new phase of the periodic grid ruling pattern. The counter 172 of the feedback branch outputs a square wave signal portrayed in the third graph line of FIG. 16. The counter 166 of the forward branch outputs a similar waveform as shown in the fourth graph line of FIG. 16. Ideally, the square wave signals outputted by the counters 166 and 172 are in synchronism with the ruling pattern of the grid 68 portrayed in FIG. 5 and also shown in FIG. 16. However, due to the dynamics of the scanning mirror 78 and the driver 84, the instantaneous position of the pilot beam 34 may deviate from the commanded location established by the forward branch of the controller 50. Such deviation from the commanded position of the pilot beam is noted by applying the new phase signal of line 160 to reset the counters 170 and 172 of the feedback branch.

Figure 16:
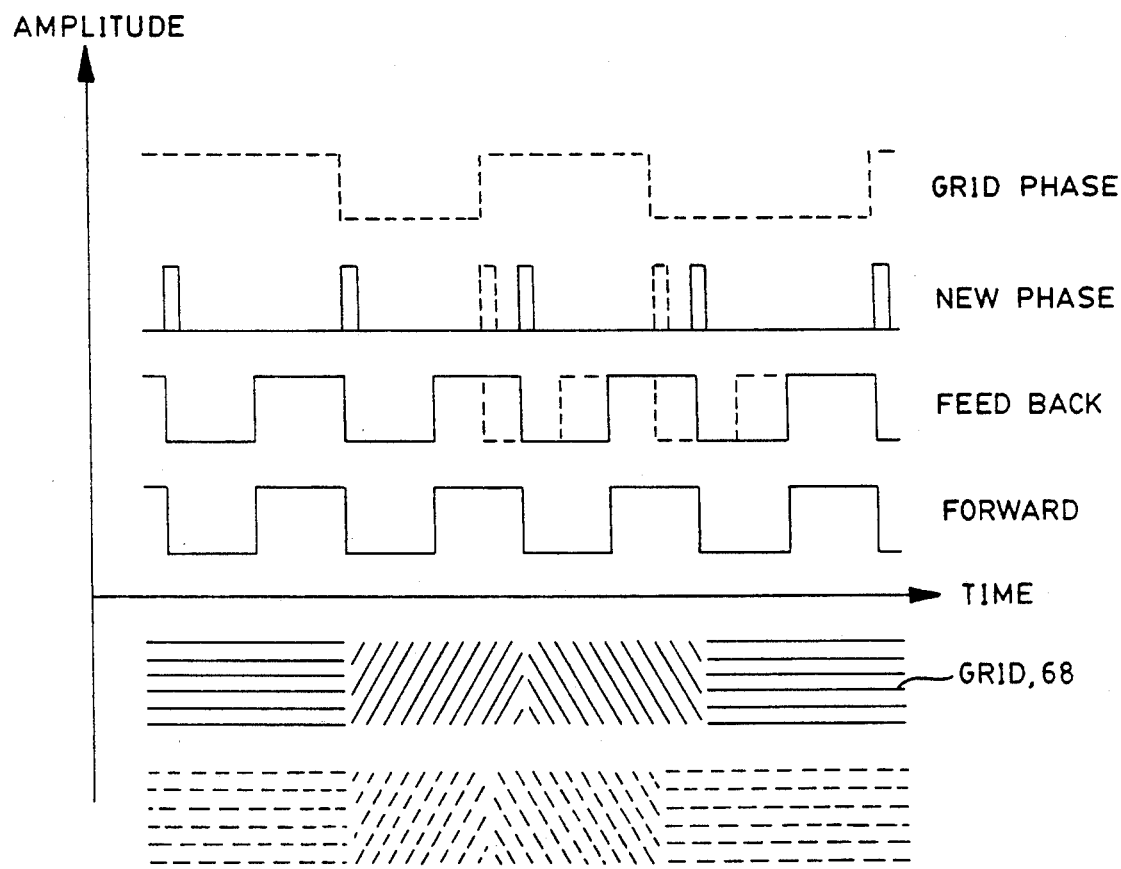
FIG. 16 is a timing diagram showing signals of a forward branch and a feedback branch of the controller.

An example of this situation is depicted in the third graph line of FIG. 16 wherein the pilot beam is presumed to have advanced to the next phase of the grid pattern prematurely with the result that a transition in the grid phase waveform occurs before completion of an output pulse of the counter 172. This is indicated in dashed lines in FIG. 16. The counters 170 and 172 are reset to zero by a correspondingly premature pulse (indicated in phantom) of the new phase signal with the result that the transition of counter 174 and the next pulse outputted by the counter 172 are advanced in time relative to the time of occurrence of the forward pulse outputted by the counter 166 (fourth graph line of FIG. 16). As a result, the count outputted by the counter 174 leads the count outputted by the counter 168 resulting in a non-zero error signal outputted by the subtracter 178 to the driver 84. The driver 84 converts the error signal into a suitable drive current to change the velocity of the pivoting mirror 78 so as to regain adequate synchronism between the actual and the commanded locations of the pilot beam 34.

A feature of the invention is the use of the output square-wave signal of the counter 170, on line 194, for driving the data print unit 108. The signal on line 194 is applied to the address unit 124 (FIG. 4) of the data print unit 108. The address unit 124 includes a counter, to be described hereinafter with reference to FIG. 18, which counts the clock pulses outputted by the counter 170 for addressing the storage 122 during the on-scale interval as well as during blind scanning when the grid 68 is not illuminated by the pilot beam 34. During the scanning process, as the pilot beam 34 passes out of view of the grid 68 at the right edge of the window 46, the new phase signals outputted by the detector assembly 70 (FIG. 8) on line 160 terminate with the result that the phasal relationship between the signals of the feedback and the forward branches as depicted in FIG. 16, becomes fixed. Therefore, the data print unit 108 continues to receive its address signals on line 194 and continues to drive the light sources 110, 112, and 114 (FIG. 4) even though the new phase signal is absent. This is important because as shown in FIGS. 12 and 13, the red, green, and blue light beams are disposed behind the pilot beam 34. Thus, even though the pilot beam 34 has advanced beyond the right edge of the window 46, the write beams 116, 118, and 120 (FIGS. 4, 4A and 4B) have not yet reached the right edge of the window 46. The foregoing feature of the invention enables the writing to occur until all of the write beams 116, 118, and 120 have passed beyond the right edge of the window 46.

The controller 50 includes a memory system 198 for driving the mirror 78 via the motor 80 and the driver 84 during intervals of time wherein the pilot beam 34 is not interacting with the grid 68 to provide the new phase signal, these intervals of time including the beam retrace, the beginning of a line scan at the left side of the window 46 prior to reaching the grid edge 90, and the conclusion of a line scan wherein the pilot beam passes over the right side of the window 46. The memory system 198 includes a memory 200 which acts as a look-up table to store the sawtooth waveform data described above with reference to FIG. 14, and transition smoothing circuitry 202 which facilitates transferring control of the scanning mirror 78 from the feedback branch of the controller 50 to the memory 200, and then back from the memory 200 to the feedback branch. The on-scale signal of line 162 is employed to reset the counters 164, 166, 168 and 174 to zero so that the addressing of the memory 200 is synchronized with the occurrence of the grid edge 90 (FIG. 2) during each line scan, and so that the feedback servo error starts at zero.

In the operation of the memory system 198, the memory 200 is addressed by the output count of the counter 168. In response to the address signal of the counter 168, the memory 200 outputs a sawtooth current waveform, in digital format, which is converted by the converter 182 into an analog signal to be applied by the amplifier 186, the switch 188 and the amplifier 184 to energize the motor 80. As described hereinabove, the switch 188 is operated by the on-scale signal and, upon termination of the on-scale state, the switch 188 reverts to the off-scale position wherein the switch 188 connects an output terminal of the amplifier 186 to the motor 80 via the servo amplifier 184. Accordingly, in the off-scale state, the amplifier 186 functions as a feedback amplifier which applies a sawtooth current to the winding of the motor 80, and the sensor 182 senses the motor winding current to generate a feedback signal for the amplifier 186. By virtue of the feedback loop, the motor current is made to track the commanded sawtooth waveform provided by the memory 200 via the converter 182. Thereby, in the absence of the new phase signal, provided by the detector assembly 70 on line 160, scanning movement of the mirror 78 continues by virtue of the sawtooth waveform command of the memory 200.

Control of the scanning movement of the mirror 78 by the memory 200 continues through completion of the end of the scan line, at the right side of the window 46 (FIG. 2), during the retrace interval, and during the beginning of the line scan at the left side of the window 46 (FIG. 2) until the pilot beam 34 impinges upon the edge 90 of the grid 68, at which point the on-scale signal and the new-phase signal reappear. Upon appearance of the signals, the switch 188 is activated to the position shown in FIG. 15 to reinstitute control of the scanning mirror 78 via the feedback branch of the controller 50.

Figure 17:
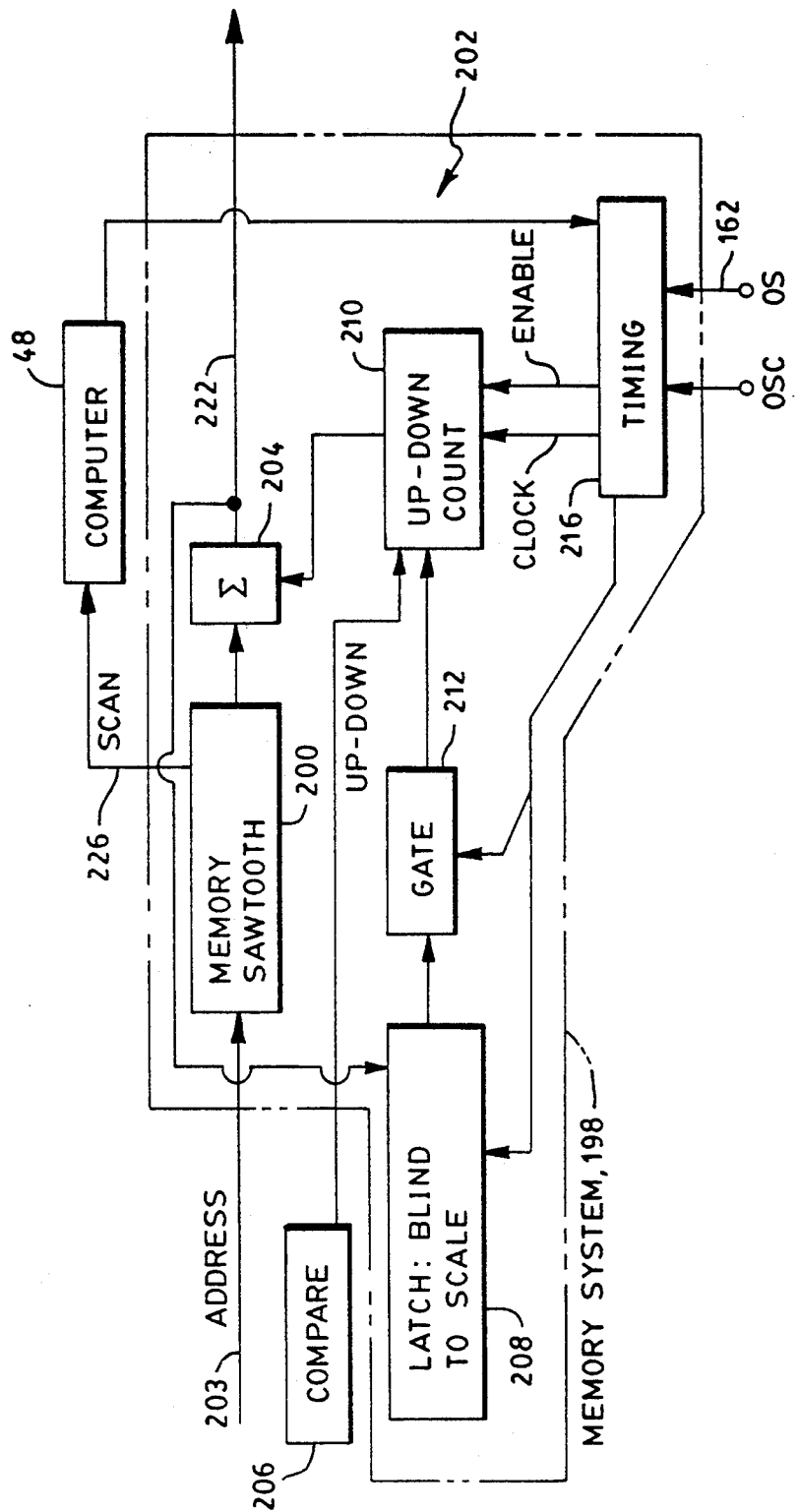
FIG. 17 is a block diagram of a memory system of FIG. 15.

FIG. 17 shows construction of the transition smoothing circuitry 202 and its interconnection with the memory 200 to provide the function of minimizing any jump in current at the motor 80 (FIG. 15) during the transfer process so as to retain a smooth movement in the mirror 78 during a scanning of a scan line. The memory 200 may be constructed as a read-only memory (ROM) to provide the above noted function of look-up table, or as a random-access memory (RAM) if it is desirable to adjust values of the look-up table. In the memory 200, preset values of current are stored at locations addressed by the counter 168 (FIG. 15) via line 203. The values stored in the memory 200 have been selected in order to provide for a smooth linear forward movement of the scanning mirror 78, to provide for a rapid retrace of the mirror 78, and to minimize vibratory movement of the mirror 78 at beginning and ends of the retrace interval. Minimization of unwanted vibration is accomplished by rounding the sawtooth waveform at both ends of the retrace interval, as shown in FIG. 14, by introduction of an essentially sinusoidal shape to the waveform in the retrace interval. Also, there is some departure from linearity in the commanded value of sawtooth current waveform to compensate for any perturbations which may have been observed in the velocity of the scanning mirror 78, the compensation for such perturbations insuring greater constancy to the velocity of the mirror 78 during the scanning of a scan line. Accordingly, the values of current outputted by the memory 200 provide for a well-defined sawtooth movement of the scanning mirror 78, but with an accuracy which is less than that obtainable by use of the new phase signal of the feedback branch of the controller 50. Accordingly, it is to be anticipated that, during a hand-off between the memory system 198 and the feedback branch of the controller 50 for control of the scanning mirror 78, a small difference in error signals may be noted at the input terminals of the switch 188 (FIG. 15). To insure a smooth transition, such difference in signal must be compensated by the transition smoothing circuitry 202 so as to minimize any jump in current occurring during a hand-off procedure.

As shown in FIG. 17, the transition smoothing circuitry 202 comprises a summer 204, a comparator 206

(shown also in FIG. 15), a latch 208, an up-down counter 210, a gate 212, and a timing unit 216. The timing unit 216 is responsive to signals of the oscillator 176 (FIG. 15) and to the on-scale signal on line 162 for generating timing signals for operation of the latch 208, the counter 210, and the gate 212. The comparator 206 and the counter 210 are employed in the hand-off procedure at the end of the line scan (right edge of the window 46 in FIG. 2) in which use of the scale of the grid 68 terminates and scanning proceeds in a blind mode without use of the new-phase signal. The latch 208 and the gate 212 are employed at the beginning of a line scan during the transition from a blind mode of scanning, without use of the new-phase signal, to the mode of scanning using the scale function of the grid 68.

In operation, and with respect to the transfer at the end of a line scan, at the right side of the window 46 (FIG. 2), the comparator 206 outputs the sign of the difference between the input signals to the switch 188 to drive the counter 210 up or down depending on the sense of the difference. The counter 210 counts clock pulses provided by the timing unit 216, and outputs its count to the summer 204. The summer 204 adds the count to the sawtooth waveform signal outputted by the memory 200 to provide an offset value of the sawtooth waveform signal via line 222 to the converter 182. This nulls the difference between the two input signals to the switch 188 so that the transition occurs smoothly. The count is continually updated, so as to minimize any jump in mirror velocity at the time of transfer. Upon termination of the on-scale signal at the right edge of the window 46, which initiates the transfer procedure, the timing unit 216 stops any further counting of the counter 210 until the pilot beam returns on scale after retrace.

With respect to the transfer at the beginning of a line scan, which occurs at the end of the interval between the left side of the window 46 (FIG. 2) and the grid edge 90, the latch 208 and the value at address zero of the memory 200 act in concert to smooth the transition. Upon occurrence of the on-scale signal at the grid edge 90, the timing unit 216 strobes the latch 208 to store the output of the summer 204 (line 222) for use in minimizing any jump during the transfer of the next scan line. Any drift in the retrace from scan to scan is sufficiently small so that the outputted value of the summer 204 employed at the scale edge in one line scan can serve adequately to estimate the value in the succeeding line scan. At the start of the retrace, after the leftmost writing beam has passed the right edge of the window 46, a control bit in the memory 200 is applied via line 226 and the computer 48 to the timing unit 216 to open the gate 212, allowing an output signal of the latch 208 to transfer into the up-down counter 210. The counter 210 has already been disabled by the timing unit 216, and the latch output value becomes a stable input, via the counter 210, to the summer 204. The effects of any resulting change in galvanometer current damp out during the retrace interval and do not degrade the printing operation.

As previously described, the address (line 203) of the memory 200 is set to zero at the occurrence of the on-scale signal at the grid edge 90. If, as shown in FIG. 14, the waveform stored in the memory is adjusted so that its value is zero at address zero, the output of the summer 204 immediately after the occurrence of this on-scale signal is exactly the same as that latched at the occurrence of the previous on-scale signal. If there has been any drift in the galvanometer (motor 80) response between lines, the small discontinuity in galvanometer current occurs while the writing beams are still obscured by the frame 44 (FIG. 1) and has damped out before the beams reach the windows 46. Under control of the comparator 206, the up-down counter 210 counts from this value to maintain tracking between the feedback and the memory branches of the controller 50, as described previously.

It is to be understood that the foregoing method of estimating the drive signal required at the scale edge of one line scan by capturing the actual value required at that point in the previous line scan is applicable to any and all points governed by the feedback branch of the controller 50 and that, in the case wherein the content of the memory 200 is modifiable (RAM) rather than fixed (ROM), the entire stored waveform can be modified to fit smoothly the response of a drifting galvanometer and nearly eliminate all discontinuities. It will also be apparent that this operation is best implemented in a programmable controller or microcomputer, and that any changes are best based on an average of several line scans.

Figure 18:
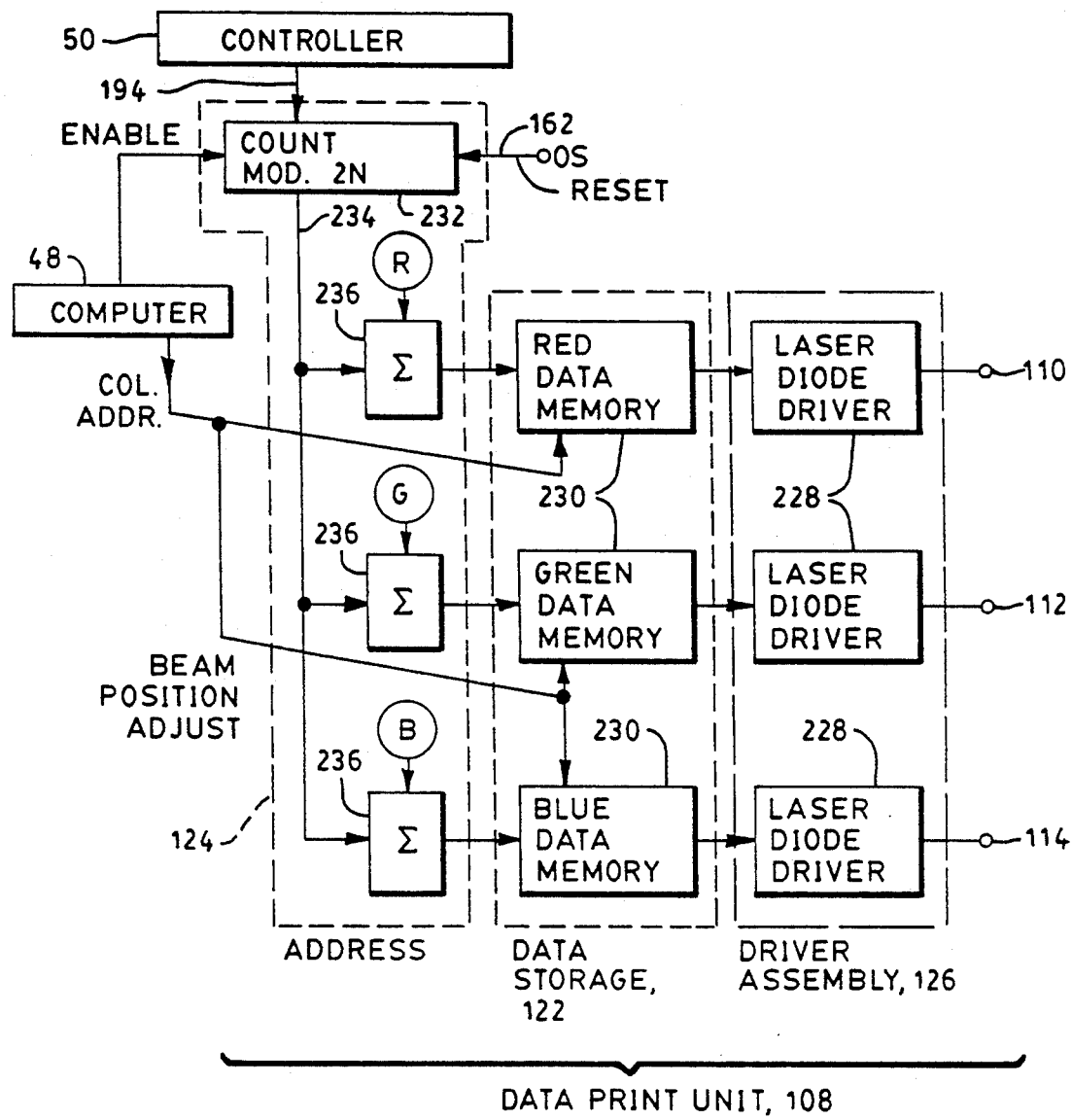
FIG. 18 is a block diagram of a data print unit of FIG. 4.

FIG. 18 shows further details in the construction of the data print unit 108 of FIG. 4. In the print unit 108, the driver assembly 126 comprises three drivers 228, and the data storage 122 comprises three memories 230 which serve to provide data, respectively, for the red, the green, and the blue beams 116, 118, and 120 provided by the corresponding light sources 110, 112, and 114. Data outputted by a memory 230, such as the red data, is supplied to a driver 228 which energizes the source 110. The driver 228 includes a current source (not shown) of sufficient power to energize the laser diode of the red source 110 to produce the red beam 116. Similarly, the green and the blue memories 230 output data via corresponding ones of the drivers 228 to energize the laser diodes of the sources 112 and 114 to produce the corresponding green and blue write beams 118 and 120. The address unit 124 includes a counter 232 which outputs a basic address on line 234 which corresponds to the position of the pilot beam 34. Correspondence between the address on line 234 and the position of the pilot beam 34 is obtained by resetting the counter 232 with the on-scale signal of line 162 (FIG. 15). The counter 232 counts modulo 2N to provide one count for each pixel to be imprinted.

The addresses to be applied to the memories 230 depend on the configuration of the array of the beams 116, 118 and 120 as shown in FIGS. 12 and 13. In the array of FIG. 12, all of the beams have the same Y address but differ in their X addresses while, in FIG. 13, all of the beams have the same X address but differ in their Y address. In the case of the array of FIG. 13, there is no need to compensate for any positional offset, along the X axis, from the position of the pilot beam 34 because of the offset A (FIG. 2) which allows the printing to begin upon illumination of the grid 68 by the pilot beam 34. For this reason, and with reference to FIG. 12, there is no need for compensation of the X address of the red beam 116; however, the X addresses of the green beam 118 and the blue beam 120 need be offset relative to the red beam 116. Also, it is noted that the arrangement of the write beams in the order of red, green and blue is presented by way of example, and that some other order such as green, red and blue may be employed if desired.

To illustrate the general case of adjustment of addresses in both the X and the Y coordinates for the write beams 116, 118, and 120, the base X-coordinate address on line 234 is offset by use of three summers 236 by adding to the base address a beam position adjustment indicated in FIG. 18 by the letters R, G, and B, respectively, for the red source 110, the green source 112, and the blue source 114. Each beam position adjustment is a digital number of fixed value dependent on the arrangement of the light sources 110, 112, and 114 on the face plate 92 (FIGS. 4a and 4B). Thereby, the base address provided by the counter 232 in combination with the beam position adjustments provide for the row component of the data address for the respective memories 230 of the light sources 110, 112, and 114. The column component of the data address is provided by the computer 48. The computer 48 also serves to enable the counter 232 to ensure that writing occurs only when each of the writing beams 116, 118 and 120 is within the image area 88 (FIG. 2).

Figure 19:
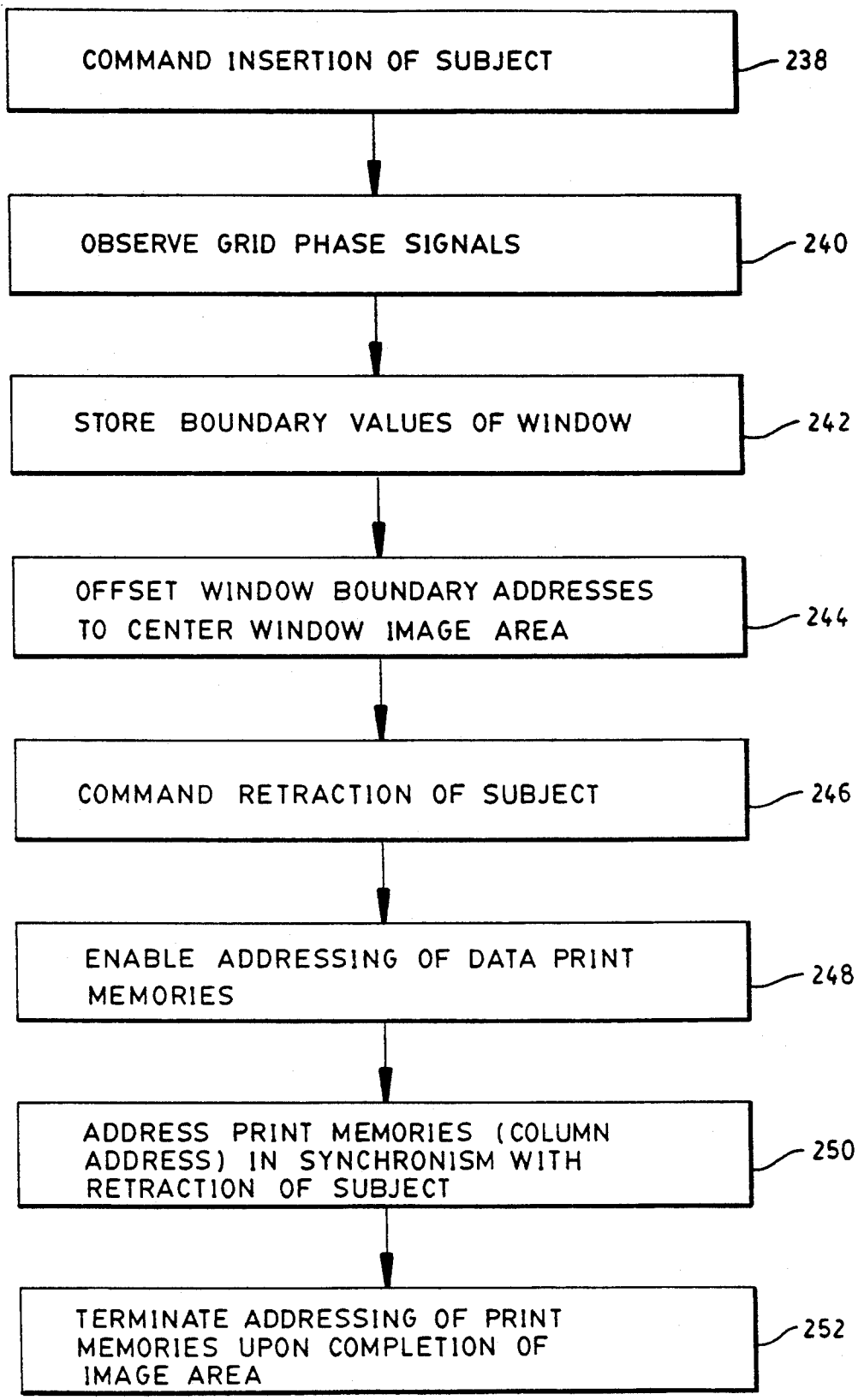
FIG. 19 is a flow graph showing operation of a computer within the controller of FIG. 1.

FIG. 19 shows a flow chart useful in explaining the operation of the computer 48 (FIG. 1). FIG. 19 expresses the more general adjustments which can readily be accomplished with a programmable controller or microcomputer. The functionality detailed above can be seen to be a special case of this more general approach. At block 238, the driver assembly 60 is activated to insert the carriage 58 with the subject 32 thereon into the print station enclosed by the housing 52. The scanning mirror 78 and the pilot beam 34 are activated during the insertion of the carriage 58, and at block 240, the on-scale signal (line 162 in FIG. 8) is observed to determine the boundaries of the window 46 (FIG. 2). The boundaries of the window 46 are stored at block 242. At block 244, the peripheral regions of the window 46 are centered within the image area 88 to define the location of the carriage 58 wherein, during withdrawal of the carriage 58, printing of the image data upon the sheet of film 42 is to be initiated and is to be terminated. Thereupon, at block 246, the drive assembly 60 is activated to initiate movement of the carriage 58 and the subject 32 thereon in the direction of withdrawal of the carriage 58 from the housing 52. As the window 46 enters the designated area for printing to begin, at block 248, the computer 48 enables the addressing of the data print memories (FIG. 18) to activate the red, the green, and the blue beams 116, 118, and 120 of FIG. 4. Then, at block 250, the print memories are addressed by row addresses for each scan line (FIG. 15) with column addressing being applied for subsequent scan lines in synchronism with the retractive motion of the subject. At block 252, the printing process is terminated as the window passes out of the image area.

By way of a further embodiment to the invention, and with reference to FIG. 4, it is noted that the principles of the invention, with respect to the guidance of a pilot beam by use of a scale of a diffraction grid, can be employed also for the reading of data on a film slide. For this purpose, illumination is reflected from the previously exposed film imprinted with imaging data, the film having the same physical configuration as the sheet of film 42, and being mounted similarly in a frame 44. The illumination is reflected to a reading detector 262, indicated in phantom. This may be accomplished by insertion of a beam-splitting mirror 263 in the optical path of the pilot beam 34 while allowing the pilot beam to propagate straight through the mirror 263 along its optical path as has been described hereinabove. During the reading process, a beam reflected from the film 42 is directed via the beam-splitting mirror 263 and an auxiliary folding mirror 264 to the reading detector 262. As the reading beam is scanned along the film, the detector 262 converts the received optical beam to electrical signals which are stored in a memory 266 under control of the controller 50. Thereby, imaging data has been read by the scanner 30 from a subject and stored within the memory 266.

In FIG. 1B, the carriage 58A providing for a two-dimensional scanning of the sheet of film 42 is shown supported for translation in the Y direction upon a pair of opposed rails 268, and carries a further pair of opposed rails 270 oriented perpendicularly to the rails 268. A holder 54A is supported for translation in the X direction upon the rails 270. The holder 54A has a load stop 64 and end walls 55, as does the holder 54 of FIG. 1, for positioning the frame 44 and holding the film flat rather than curved. The holder 54A carries the frame 44 and the sheet of film 42 during the fast scan (along the X direction) and the slow scan (along the Y direction) during scanning movements applied to the holder 54A by the X drive and the Y drive under command of the controller 50.

By way of alternative embodiments, it is noted that the scanner 30 can be constructed so as to use a single beam to provide both the functions of the pilot beam and a write beam. For example, in the case of imprinting a monochromatic film in a single color, the light sources 110, 112 and 114 of FIG. 4 can be deactivated, and the pilot light source 74 would emit radiation at a frequency at which the radiation is partially absorbed by a pigment of the film, and is partially transmitted through the film to the diffraction grid to provide the diffracted beams of light. The diffracted beams of light allow the scanner to function in the same fashion as though a separate pilot beam were employed, except for the need to adjust addressing of the print memory to compensate for the fact that there is no offset between pilot and print beams.

Figure 20:
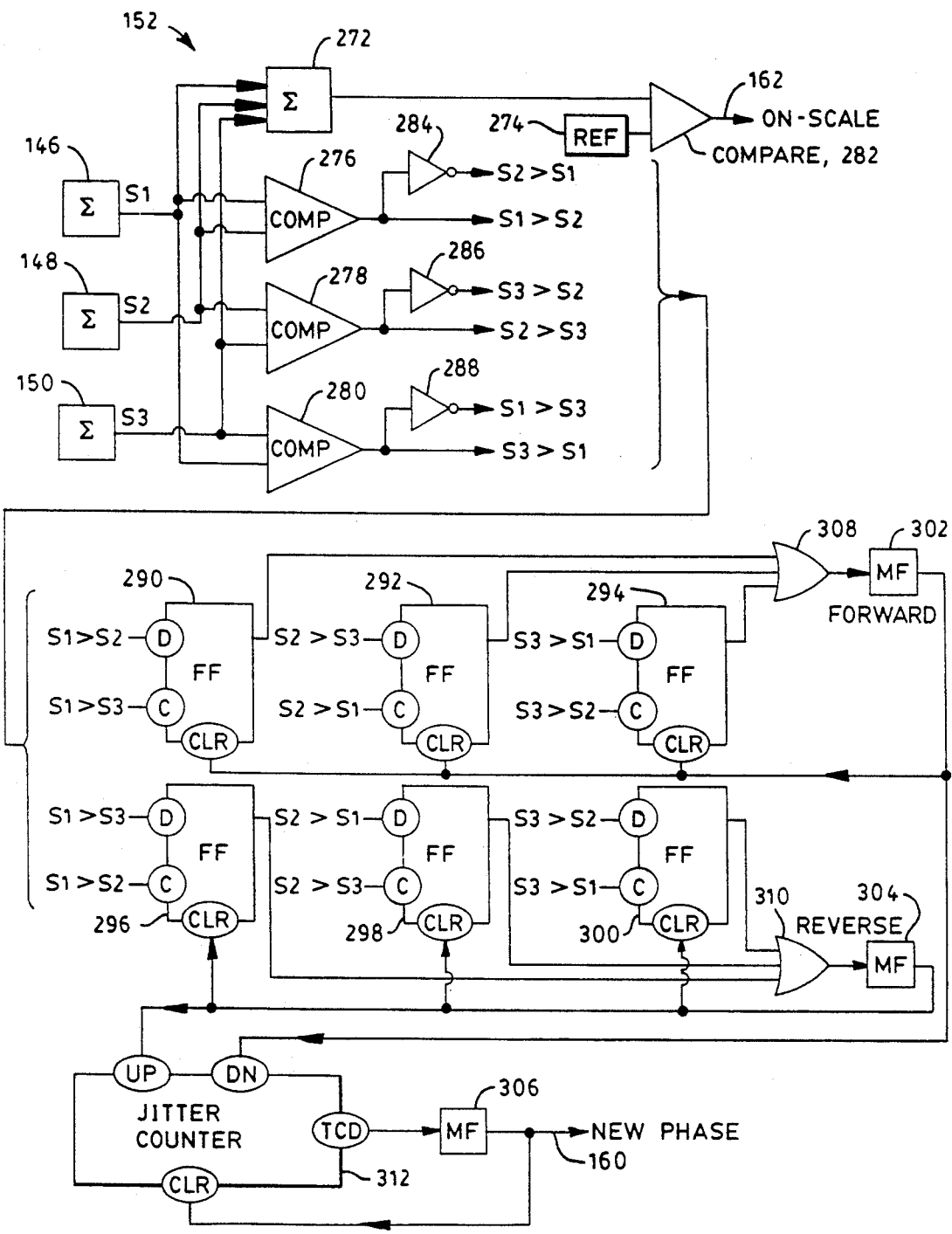
FIG. 20 is a block diagram of a signal processor of FIG. 8 providing grid phase signals for timing operation of the system of FIG. 15.

FIG. 20 shows details in the construction of the signal processor 152 and its interconnection with the summers 146, 148, and 150 (FIG. 8). The signal processor 152 comprises a summer 272, a source 274 of reference voltage four comparators 276, 278, 280, and 282, three inverters 284, 286, and 288, six type-D flip-flops 290, 292, 294, 296, 298, and 300, three monostable flip flops 302, 304, and 306, two OR gates 308 and 310, and an up-down counter 312.

In operation, and with reference also to FIG. 11, the summers 146, 148, and 150 output respectively the signals S1, S2, and S3 of the diffracted beams from each of the three phases of the grid 68 to the summer 272 which forms the sum of the detector signals S1, S2, and S3. The summers 146, 148, and 150 may be constructed, by way of example, as transconductance amplifiers which receive signals of the detectors 106 in the form of detector currents, and convert the current signals to voltage signals for application to the summer 272. As has been described hereinabove, substantially all of the optical energy of the pilot beam 34 impinging upon the grid 68 is returned within the diffracted beams with the result that the total energy received at a peak value of any one of the S1, S2, and S3 signals is approximately equal to the sum of two of the signals produced at an interface between two of the regions 128 of the grid 68. On the other hand, when the pilot beam does not impinge on the grid, most of the optical energy is in the zero order beam area and does not activate the detectors 106. The signal outputted by the summer 272 is compared by the comparator 282 with a voltage reference from the source 274 to provide the on-scale signal on line 162 when the signal outputted by the summer 272 exceeds the value of the reference signal. The reference signal establishes a minimum value for ascertaining that the signal outputted by the summer 272 is indicative of the presence of illumination of the grid 68 by the pilot beam 34.

The S1 and the S2 signals are fed to the comparator 276 which subtracts the S2 signal from the S1 signal and outputs a logic-1 (high) signal when the S1 signal is greater than the S2 signal, and outputs a logic-0 (low) signal when the S2 signal is greater than the S1 signal. The output terminal of the comparator 276 is connected to the inverter 284 which provides a logic-1 signal when the S2 signal exceeds the S1 signal, and a logic-0 signal when the S1 signal exceeds the S2 signal. In similar fashion, the S2 signal of the summer 148 and the S3 signal of the summer 150 are applied to the comparator 278 which outputs a high signal when the S2 signal is greater than the S3 signal, and a low signal when the S3 signal is greater than the S2 signal, while the inverter 286 coupled to the output terminal of the comparator 278 outputs the inverted logic signal. Similarly, the S1 and the S3 signals are applied to the comparator 280 which indicates, by a logic-1 signal that the S3 signal is greater than the S1 signal and, by a logic-1 signal of the inverter 288, indicates that the S1 signal is greater than the S3 signal.

The six comparator signals provided by the comparators 276, 278, and 280 in conjunction with the inverters 284, 286, and 288 are applied to the bank of six type-D flip flops 290, 292, 294, 296, 298 and 300 to determine a direction of movement of the pilot beam 34 relative to the grid 68 during a scanning of the pilot beam in the X direction. Normally, the pilot beam moves in the forward direction during a scanning in the X direction (the fast scan). However, it is possible for the pilot beam to move momentarily in the reverse direction as might occur in the event that the scanner 30 were jarred during its operation. For example, conceptually, an operator of the scanner 30 might accidentally bump the scanner 30 resulting in a momentary deflection of the pilot beam in the reverse direction. Electrical noise may also result in apparent brief reverse motion of the pilot beam.

In accordance with a feature of the invention, the signal processor 152 delays outputting of further pulses of the new phase signal on line 160 until the pilot beam 34 has regained its proper position relative to the grid 68 and is moving in the forward direction. By virtue of this temporary termination of the new phase signal on line 160, the signal processor 152 enables the printing and reading functions of the scanner 30 to be accomplished without degradation from jitter in the position of the pilot beam 34 relative to the grid 68.

The operation of the bank of type-D flip flops may be understood with reference to the portrayal of the detector signals and the diffraction grid in FIG. 11. By way of example, the S2 signal attains a peak intensity when the pilot beam is in the mid portion of the grid region R2. The amplitudes of the S1 and the S3 signals are substantially lower than that of the S2 signals when the pilot beam is in the central portion of the grid region R2. However, as the beam moves towards the interface between the grid regions R2 and R3, the amplitude of the S2 signal is reduced while the amplitude of the S3 signal increases. As the center of the pilot beam crosses the interface from the grid region R2 into the grid region R3, there is a reversal in the relationship of intensities of the S2 and the S3 signals such that the S3 signal now exceeds the S2 signal. The result of the transition in the relative amplitudes of the S2 and the S3 signals is presented by a low-to-high transition at the output of the inverter 286 as the output voltage of the comparator 278 goes from a high value to a low value as the pilot beam crosses over from the grid region R2 to the grid region R3. This occurs during forward movement of the beam. On the other hand, if the pilot beam were to travel in the reverse direction from grid region R3 to grid region R2, then the output voltage of the comparator 278 would pass from a low voltage to a high voltage. Similar transitions in voltage are provided at the comparator 276 during transitions of the pilot beam past the interface between grid regions R1 and R2, and at the comparator 280 for transitions of the pilot beam past the interface between the grid regions R3 and R1. In particular, it is noted that use of six comparator signals provides the result that, for each crossing of an interface between contiguous grid regions 128 by the pilot beam, there is a pair of transition signals one of which goes from low to high and the other of which goes from high to low.

Advantage is taken of the foregoing transitions in comparator signals by use of the six type-D flip-flops wherein each of their respective clock, C, input signals is effective only during a positive transition of clock signal amplitude to institute a reading of the signal inputted at the D terminal. Thus, each of the flip-flops 290, 292, 294, 296, 298 and 300 responds to one and only one of the six comparator signals. However, there is still an uncertainty in that each comparator has a positive transition in one phase of the grid for forward motion and in another (180° shifted) phase for reverse motion. For example, the flip-flop 292 can be clocked by a transition between the grid regions R1 and R2 for a forward direction of beam travel. However, flip-flop 292 can also be clocked in the middle of region R3 during reverse motion as the right edge of the pilot beam footprint leaves region R1 and the left edge enters region R2 wherein the comparator signal S2>S1 also changes from a low value to a high value. It is apparent that the first case gives the more precise position information in that both signals being compared S1 and S2 are changing at a rapid rate regardless of pilot beam footprint whereas in the second case, for a footprint smaller than the width of the R3 region, at most one of S1 or S2 is changing and, in fact, both may be simultaneously zero for an extended time. With the signal S2>S3 connected to the data input of flip-flop 292, positive output transitions are suppressed in this less precise case thereby increasing the degree of accuracy at which the beam position is determined. The reverse situation occurs at the flip flop 296 which is clocked by the S1>S2 comparator signal so that its output goes from a low value to a high value only upon a crossing by the pilot beam between grid regions R2 and R1 in the reverse direction. By use of this reasoning, it is seen that the upper set of flip-flops 290, 292, and 294 is active for movement of the beam in the forward direction while the lower set of flip-flops 296, 298, and 300 is active for movement of the pilot beam in the reverse direction. Also, it is noted that the first column of flip-flops 290 and 296 relate to movement of the pilot beam into the grid region R1, the second column of flip flops 292 and 298 relate to movement of the pilot beam into the grid region R2, and the third column of flip-flops 294 and 300 relate to movement of the pilot beam into the grid region R3.

Upon operation of any one of the flip-flops 290, 292, and 294 of the forward set, the flip-flop outputs a signal which is applied via the OR gate 308 to trigger the flip-flop 302 to generate a pulse signal applied to the down (DN) terminal of the counter 312. The output pulse of the flip-flop 302 is applied also to the clear (CLR) terminals of the flip flops 290, 292, and 294 to clear the flip-flops and prepare them for the next phase transition of the pilot beam scanning the grid 68. In similar fashion, upon operation of any one of the flip-flops 296, 298, and 300 of the reverse set, the flip flop outputs a signal via the OR gate 310 to trigger the flip-flop 304 to generate a pulse signal applied to the UP terminal of the counter 312. The pulse produced by the flip-flop 304 is applied also to clear the flip-flops 296, 298, and 300 to prepare them for the next phase transition in the scanning of the pilot beam along the grid 68.

The counter 312 is preset to zero, and counts down by one count for each pulse applied by the flip-flop 302 to the DN terminal. The counter 312 counts up by one count for each pulse applied by the flip-flop 304 to the UP terminal. In the situation wherein the count of the counter 312 is at zero, and a pulse is applied to the DN terminal, the counter 312 outputs a pulse signal as a trickle count down (TCD) pulse signal which triggers the flip-flop 306 to output a pulse signal on line 160 to serve as the new-phase signal. The new-phase signal is applied also to clear the counter 312 and restore its count to zero. Thus, during forward motion of the pilot beam over the diffraction grid, the counter 312 repetitively issues TCD pulses to the flip-flop 306 which, in turn, produces a succession of new-phase pulse signals. However, in the event of a reverse movement of the pilot beam along the diffraction grid, no output pulse is applied to the DN terminal of the counter 312, but one or more pulses are applied to the UP terminal of the counter 312. The number of pulses applied to the UP terminal depends on the extent of the jarring movement applied to the scanner 30. For example, one pulse, three pulses, six or even more pulses may be applied to the UP terminal of the counter 312. By way of example, the counter 312 may count modulo 16 or modulo 32 or modulo some other quantity wherein the maximum count of the counter 312 is sufficient to accommodate the expected magnitude of jarring movements to the scanner 30. During the up counting by the counter 312, no TCD pulse is outputted by the counter 312 and, in corresponding fashion, no new-phase signal pulses appear on line 160. At the conclusion of the jarring movement applied to the scanner 30, the pilot beam resumes its forward motion over the diffraction grid with the result that pulses again appear at the DN terminal of the counter 312. As a result, the counter 312 begins to count down. Still, no TCD pulses are outputted by the counter 312 until the count reaches a value of zero, this indicating that the pilot pulse has returned to its location in the diffraction grid, which location existed at the instant of the jarring movement. Upon the next occurrence of a pulse from the flip-flop 302 to the DN terminal of the counter 312, the counter 312 outputs a TCD pulse which triggers the flip-flop 306 to produce a new-phase pulse signal on line 160. Thereupon, successive pulses of the new-phase signal appear upon the occurrence of successive pulses of the flip flop 302 resulting from the forward movement of the pilot beam across the diffraction grid.

By virtue of the foregoing operation of the scanner, it is appreciated that the invention provides for smooth transitions between sighted scanning, wherein the diffraction grid is illuminated by the pilot beam, and blind scanning, and that the invention electrically isolates the writing and reading processes from effects of a physical jarring of the scanner.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A scanning system comprising:
   a film holder having a support surface for holding film, and optical means for directing a set of beams of light having at least one beam of light toward said support surface, said holder holding the film normal to said beam set, said optical means including scanner means serving to scan said beam set in a scanning direction across the film in a scan line;
   a grid disposed in said support surface and normal to said beam, said grid having a periodic array of groups of rulings oriented in differing directions for interaction with said beam set upon propagation of said at least one beam through the film, said groups of rulings diffracting light of said one beam in different directions to provide a pattern of diffracted beams indicative of a location of said one beam;
   an optical detector assembly including a plurality of optical detectors arranged in an array and positioned for receiving light of respective ones of said diffracted beams, said detector assembly producing phase signals indicative of a progression of said one beam relative to said groups of rulings;
   command means for commanding said scanner means to scan said beam set along a succession of pixels of said scan line;
   corrector means responsive to signals outputted by said detector assembly over at least a portion of said scan line for correcting the location of said beam set to substantially match the locations of pixels designated by said command means; and
   a data memory, said command means addressing said data memory for communicating image data between said data memory and said beam set, a beam of said beam set interacting with the film to provide said image data.

2. A system according to claim 1 wherein said one beam has a radiation frequency suitable for partial absorption by the film and partial transmission through the film to provide dual functions of a data transmission beam and a pilot beam.

3. A system according to claim 1 wherein said beam set includes a plurality of beams, wherein said one beam is a pilot beam and a second beam provides the function of transmission of data between the film and said data memory.

4. A system according to claim 3 wherein said second beam is a write beam.

5. A system according to claim 3 wherein said second beam is a read beam.

6. A system according to claim 1 wherein said command means comprises a scan-path memory storing a set of scan-path command signals for directing said scanner means during a cessation of said diffracted beams; and transfer means responsive to a signal of said detector assembly for interposing signals of said scan-path memory in place of signals of said corrector means for commanding said scanner means.

7. A system according to claim 6 wherein said command means includes means for subtracting a feedback signal of said corrector means from a command signal of said command means to provide an error signal for driving said scanner means.

8. A system according to claim 7 wherein said corrector means and said command means each include counting means driven by a common clock to command said beam set to advance along a scan line, a count of said corrector means being offset by the phase signal of said detector assembly from a count of said command means to generate said feedback signal.

9. A system according to claim 8 wherein an output signal of said corrector means is locked to an output signal of said command means in the absence of said diffracted beams.

10. A system according to claim 7 wherein said scanner means includes a periodically operated beam deflector for deflecting said beam set along a scan line; and signals outputted from said scan-path memory are directed to said scanner means during a retrace of said beam deflector between successive scan lines.

11. A system according to claim 10 wherein said transfer means includes means for measuring a drive offset between said error signal and a signal outputted from said scan-path memory.

12. A system according to claim 11 wherein said transfer means includes means for latching said drive offset for adjusting an output signal of said scan-path memory during a transition between a retrace interval of said beam deflector and a scanning of a scan line by said beam deflector.

13. A system according to claim 12 wherein said periodically operated beam deflector is a periodically pivoted mirror.

14. A system according to claim 1 wherein said detector assembly includes means for detecting jitter in a sequence of diffracted beams, and means for adjusting said phase signals to compensate for said jitter.

15. A system according to claim 14 wherein said jitter detecting means includes means responsive to relative magnitudes of said diffracted beams to sense direction of propagation of said beam set across said grid.

16. A system according to claim 15 wherein said phase adjusting means includes an up-down counter counting in one direction during a forward scan motion of said beam set, and in an opposite direction during a reverse scan motion of said beam set, said phase signals being outputted only during a counting by said up-down counter in said one direction from the previous position in which said up-down counter counted in a forward scan motion.

17. A system according to claim 1 further comprising means for translating said holder relative to said scanner means in a translation direction perpendicular to said scanning direction to provide for a two-dimensional scan of the film, and wherein the film is encircled by a frame having a window allowing propagation of light of said one beam through the film to impinge upon said grid, the frame facilitating a positioning of the film upon said holder.

18. A system according to claim 17 wherein said command means comprises current waveform means for supplying current to said scanner means during an absence of said diffracted beams.

19. A system according to claim 18 wherein said window has a leading edge and a trailing edge, a scan of said scanner means progressing from said leading edge towards said trailing edge of said window;

said grid has a front edge normal to said scanning direction and positioned between said leading edge and said trailing edge with a gap between said front edge and said leading edge, said beam set including a plurality of beams wherein said one beam is a pilot beam and a second beam is a write beam;

said gap is sufficiently large to permit a viewing of said front edge of said grid through said window by said pilot beam even during a misalignment of the frame with said holder, said front edge of said grid providing said system with a reference location of said pilot beam during a scanning of the film for accurate positioning of image data relative to said holder; and said write beam is offset from said pilot beam by a distance substantially equal to said gap, said scanner means being operative to initiate writing by said write beam upon a passage of said pilot beam past the front edge of said grid.

20. A system according to claim 19 wherein said translating means provides an insertion movement followed by a retraction movement of said holder, misalignment being measured during said insertion and said scanning being accomplished during said retraction movement.

21. A system according to claim 20 wherein said measure of misalignment is accomplished by viewing said grid through said window by said pilot beam.

22. A system according to claim 21 wherein said scanner means compensates for a misalignment between the frame and said holder by scanning a field of image data larger than said window.

23. A system according to claim 18 wherein:

said scanner means comprises a mechanical structure including a movable optical element for directing said beams of light;

said command means provides for a periodic scanning movement to said optical element, said command means further comprising a digital clock and a counter of clock pulses outputted by said clock; and said current waveform means includes a scan memory which is addressable by said counter to output drive signals to said scanner means in the form of a sequence of scan-location values of a sinusoidally modified ramp function to minimize ringing in said mechanical structure of said scanner means.

24. A system according to claim 18 wherein said scanner means includes a scanning mirror, a motor means for positioning said scanning mirror, a drive circuit for energizing said motor means, and means for switching said drive circuit alternately between said corrector means and said current waveform means dependent on the presence or absence of said diffracted beams.

25. A system according to claim 1 wherein said set of beams comprises a group of write beams for writing image data upon the film.

26. A system according to claim 25 wherein said group of write beams comprises three write beams operative at three different electromagnetic frequencies for exciting three different color dyes within the film, said three write beams being arranged colinearly, a plurality of said group of write beams being offset in position relative to said pilot beam.

27. A system according to claim 26 wherein said three write beams are arranged in a line perpendicular to a scan line and offset along said scan line from said pilot beam by a distance sufficient to allow said pilot beam to reach a front edge of said grid prior to activation of said group of write beams.

28. A system according to claim 26 wherein said three write beams are arranged in a line parallel to a scan line and are offset from said pilot beam by a distance sufficient to allow said pilot beam to reach a front edge of said grid before activation of any one of said group of write beams, a set of address signals for said data memory being provided for said group of write beams by incrementing an address of said data memory to compensate for positional delays between a second and a third of said group of write beams from said pilot beam.

29. A system according to claim 1 wherein said beam set comprises a plurality of beams, said one beam being a pilot beam and a second, a third and a fourth of said beams being a set of read beams for reading image data from the film.

30. A system according to claim 1 wherein said grid is operative in a reflective mode.

31. A system according to claim 1 wherein said grid is operative in a transmission mode.

* * * * *